US006633336B2

(12) United States Patent
Toyoizumi et al.

(10) Patent No.: US 6,633,336 B2
(45) Date of Patent: *Oct. 14, 2003

(54) ELECTRONIC APPARATUS AND POINTING DEVICE FOR IMAGING

(75) Inventors: Yoshiyuki Toyoizumi, Yokohama (JP); Hideyuki Arai, Kawasaki (JP); Kazunori Kashimura, Tokyo (JP); Kunio Motohara, Kawasaki (JP); Junichi Doi, Inagi (JP); Hiroshi Hosoe, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/572,092

(22) Filed: Dec. 14, 1995

(65) Prior Publication Data

US 2001/0038420 A1 Nov. 8, 2001

(30) Foreign Application Priority Data

Dec. 16, 1994 (JP) .............................................. 6-313281
Sep. 5, 1995 (JP) .............................................. 7-228001
Oct. 11, 1995 (JP) .............................................. 7-263180

(51) Int. Cl.⁷ ......................... H04N 5/222; H04N 5/225
(52) U.S. Cl. .......................... 348/333.02; 348/333.06; 348/333.12; 348/374; 348/375

(58) Field of Search ................................. 348/207, 222, 348/239, 333, 334, 346, 373, 374, 375, 376, 65; 358/906, 909.1; 396/281, 287, 290, 291, 292, 373, 374, 383; 345/161; 463/37, 38; H04N 5/262, 5/225

(56) References Cited

U.S. PATENT DOCUMENTS

| 4,492,830 | A | * | 1/1985 | Kim ............................ 345/161 |
| 4,794,388 | A | * | 12/1988 | Matthews .................... 345/161 |
| 5,309,242 | A | * | 5/1994 | Asami et al. ................. 348/97 |
| 5,373,317 | A | * | 12/1994 | Salvati ........................ 348/65 |
| 5,396,287 | A | * | 3/1995 | Cho ............................ 348/211 |
| 5,488,414 | A | * | 1/1996 | Hirasawa et al. ........... 348/207 |
| 5,659,814 | A | * | 8/1997 | Matsukawa ................. 396/121 |
| 5,706,049 | A | * | 1/1998 | Moghadam et al. ........ 348/333 |
| 5,847,694 | A | * | 12/1998 | Redford ...................... 345/161 |
| 5,883,618 | A | * | 3/1999 | Wu ............................. 345/161 |

* cited by examiner

Primary Examiner—Ngoc-Yen Vu
(74) Attorney, Agent, or Firm—Morgan & Finnegan, LLP

(57) ABSTRACT

An electronic apparatus according to this invention has a display unit for displaying an index, an operation unit used for moving the index displayed by the display unit, and an adjustment unit for adjusting the operation unit, so that the moving direction of the index displayed by the display unit matches a moving direction that an operator intended. This invention can provide an effect of matching the moving direction that the operator intended with the actual moving direction of the index.

18 Claims, 23 Drawing Sheets

PRIOR ART

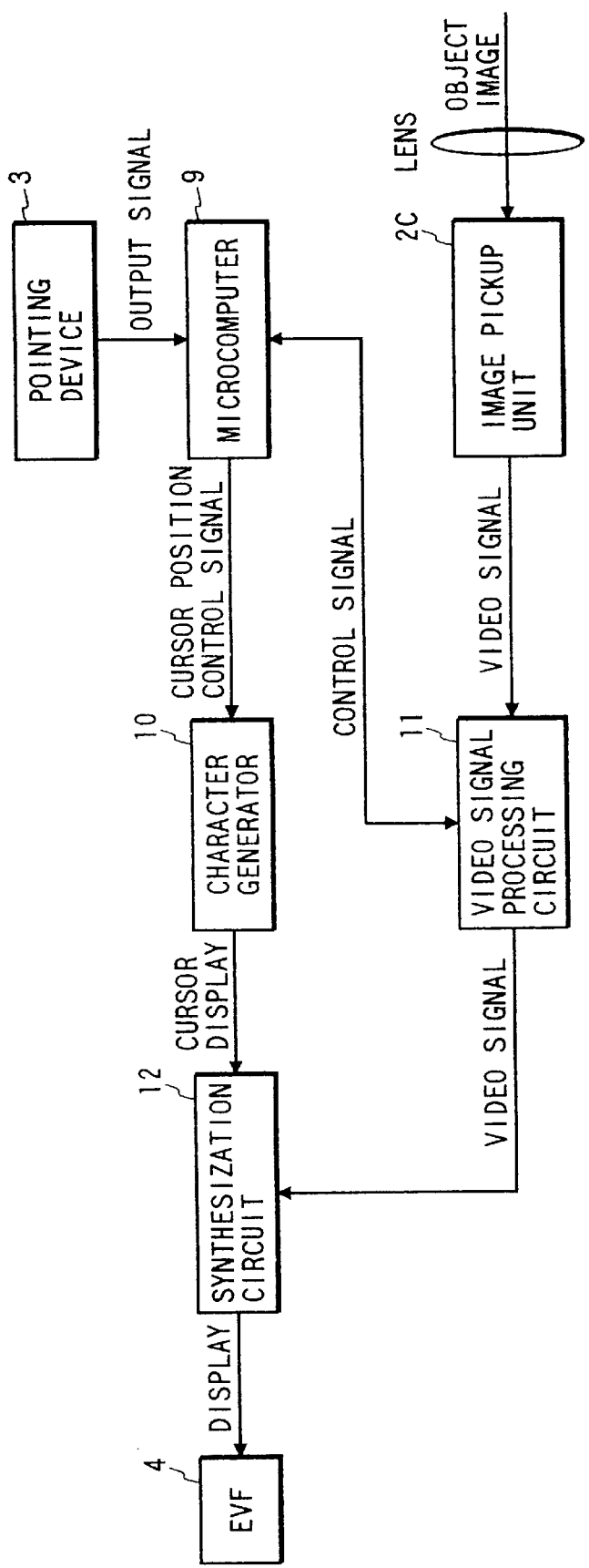

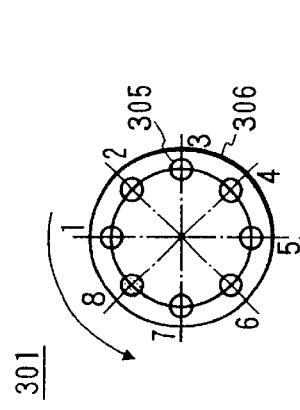
FIG. 23A
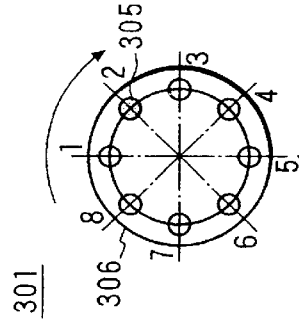
FIG. 23B
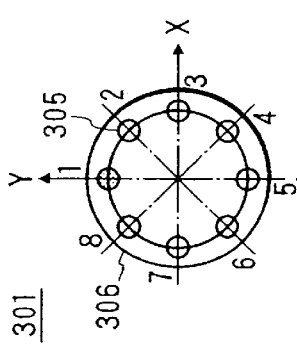
FIG. 23C
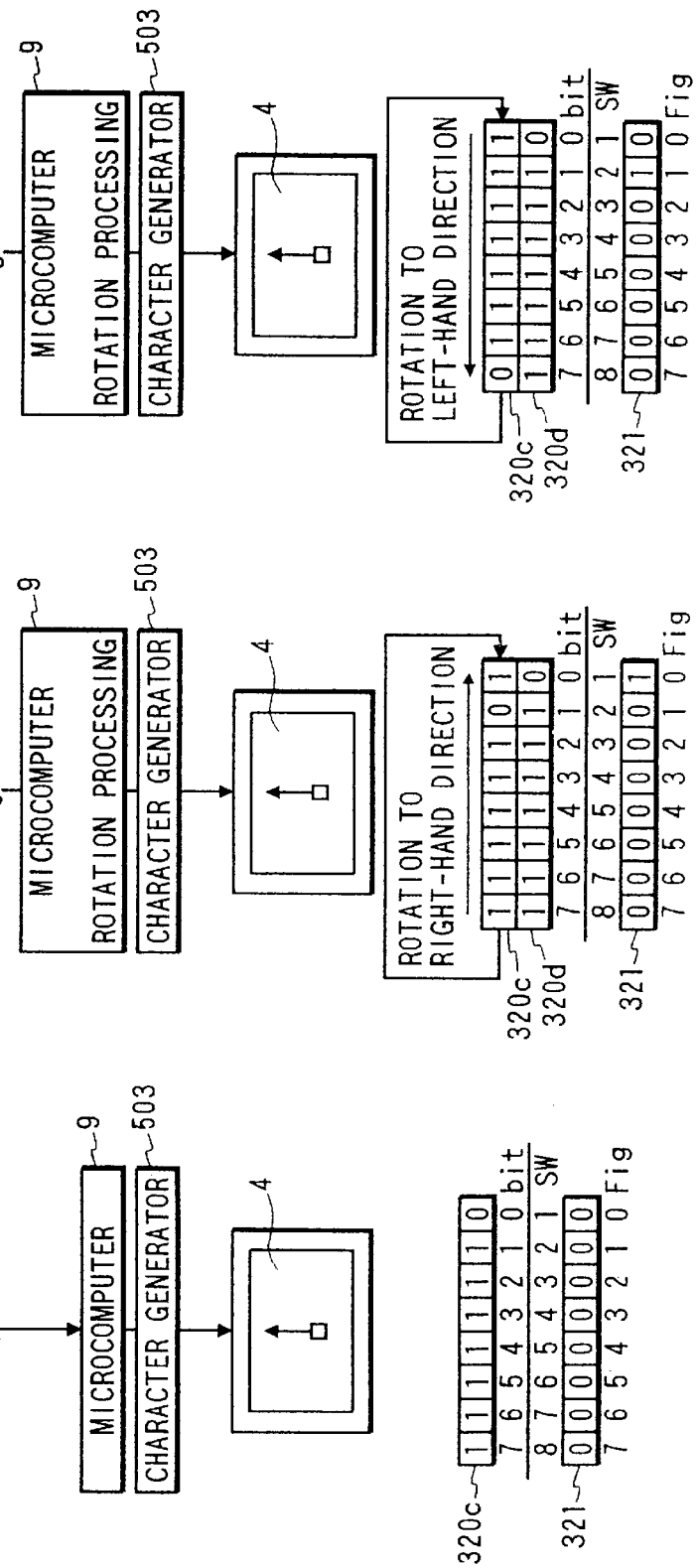

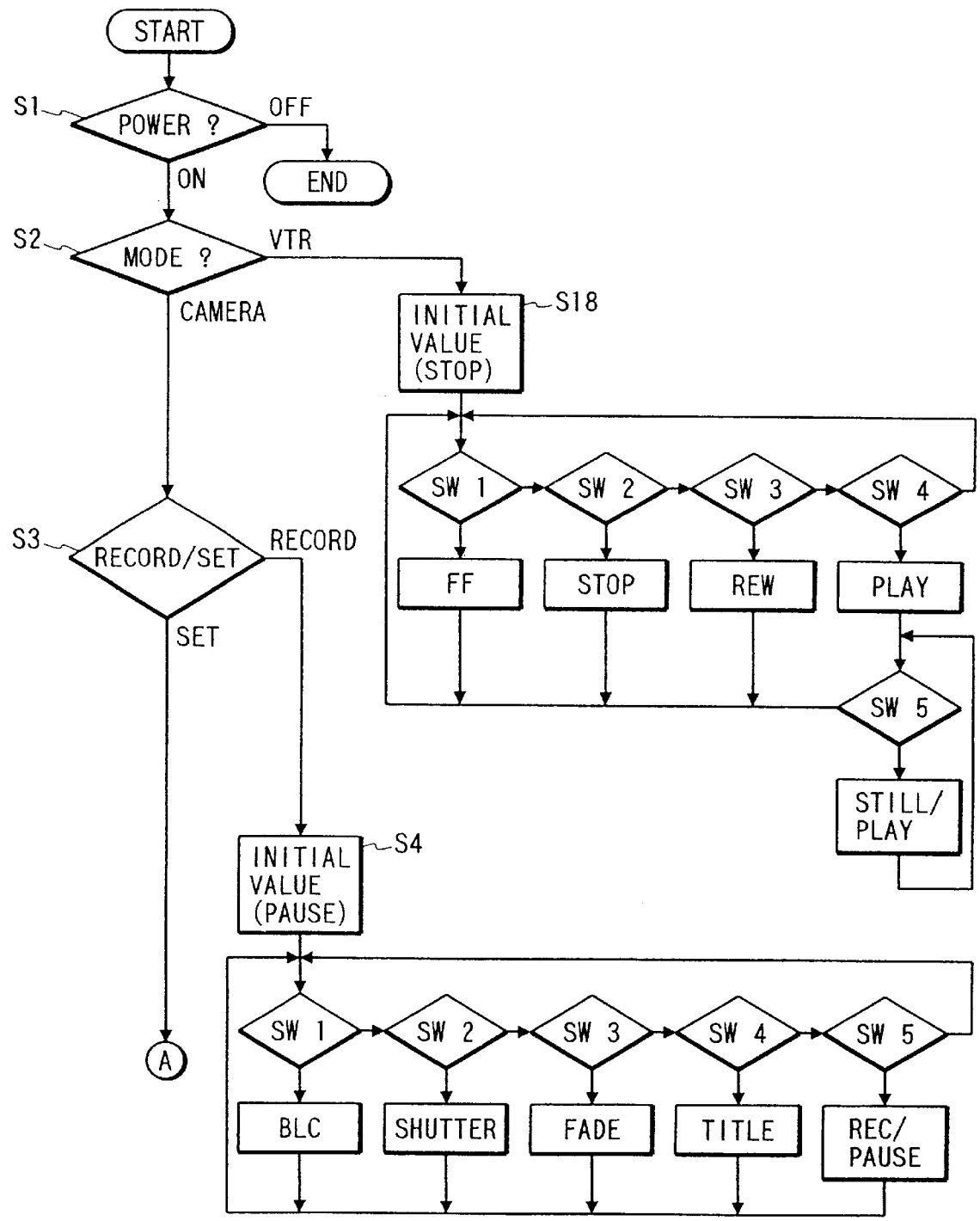

ELECTRONIC APPARATUS AND POINTING DEVICE FOR IMAGING

BACKGROUND OF THE INVENTION

1. Field of the Invention

The present invention relates to an electronic apparatus and, more particularly, to its operation.

2. Related Background Art

In a conventional electronic apparatus such as a personal computer, a pointing device such as a track ball is popularly used for performing operations for moving a cursor displayed on a monitor screen, selecting one of a plurality of items, and so on.

FIG. 1 shows an example in which a pointing device 3 is arranged on the main body of a video camera 100. Note that the video camera 100 comprises an EVF (electronic viewfinder) as a monitor 4.

With such a pointing device, since operations for a plurality of functions of the apparatus can be assigned to a single operation member, a simple operation unit can be realized, thus contributing to a size reduction of the apparatus. Since two or more switches can be assigned to a single operation member, an operator can perform two or more switch operations by selecting only the operation direction of the pointing device without releasing his or her hand from a key. For this reason, as compared to a case wherein one function is assigned to one key, the pointing device is easy to operate since a user need not fumble for or visually confirm an operation member.

However, the operation feeling of a conventional compact pointing device, which is operated by a finger tip and has a base portion fixed to the apparatus main body, varies depending on the size of the operator's hand, the posture of the main body, and the like. For example, the position of the finger tip does not match the position of the pointing device due to personal differences of, e.g., the size of the hand, the length of the finger, and the like, resulting in a restrained operation and hence, poor operability.

For this reason, as shown in, e.g., FIGS. 2A and 2B, when the cursor displayed on the monitor 4 is moved by operating a pointing device with a finger tip, even though an operator wants to move the cursor in the right-hand direction, as shown in FIG. 2A, the operation direction deviates due to a delicate position deviation of the finger tip, and the cursor is undesirably moved in an obliquely upper or lower right-hand direction, as shown in FIG. 2B.

When movement of the cursor or selection of a menu item displayed on the EVF as the monitor 4 is performed using the pointing device 3 shown in FIG. 1, an operator looks into the EVF while bringing his or her face close to the main body of the video camera 100, and operates the pointing device 3 with his or her finger tip. Therefore, it is difficult for the operator to operate the pointing device 3 while visually confirming its position and operation direction, and the operator must operate the pointing device while fumbling for it. For this reason, the operability is often impaired depending on the size of the hand or the length of the finger of the operator, the holding position of the video camera 100, or the like. As a result, the operator cannot attain movement of the cursor or selection of a menu item, that he or she intended.

Furthermore, as shown in FIG. 3, a method of displaying the operation contents using a liquid crystal display screen or the like is available. Referring to FIG. 3, operation contents 11 are displayed on the lower portion of the screen of an electronic viewfinder 4 comprising a liquid crystal display, and an operator depresses one of switches arranged below the operation contents 11 to attain the displayed operation. The displayed contents are switched in synchronism with a mode switch 5, and operation contents corresponding to a selected mode (camera and VTR) are displayed. In the case of FIG. 3, a VTR mode is selected, and a fast feed (FF) operation, a stop (STOP) operation, and the like are displayed. Trigger button 6 designates start and stop of reproduction.

However, in the prior art shown in FIG. 3, AE, AF, and the like cannot be set at an arbitrary position on the screen.

SUMMARY OF THE INVENTION

It is an object of the present invention to provide an electronic apparatus which is easy to operate.

It is another object of the present invention to provide an operation device with good operability for an electronic apparatus.

It is still another object of the present invention to provide an image pickup apparatus which is easy to operate, and has good operability.

In order to achieve the above-mentioned objects, according to an embodiment of the present invention, an electronic apparatus which can be used in a hand-held state, comprises display means for displaying an index, operation means used for moving the index displayed by the display means, and adjustment means for adjusting an attachment state of the operation means to the electronic apparatus to at least a first attachment state and a second attachment state different from the first attachment state, and in the first and second attachment states, an operation for moving the index using the operation means can be performed.

According to another embodiment of the present invention, an electronic apparatus comprises display means for displaying an index, operation means used for moving the index displayed by the display means, and adjustment means for adjusting an attachment position of the operation means to the electronic apparatus by sliding the operation means at least from a first attachment position to a second attachment position different from the first attachment position, and at the first and second attachment positions, an operation for moving the index using the operation means can be performed.

With the above-mentioned arrangement, when the electronic apparatus is used in a hand-held state, the mounting state of the operation means to the apparatus main body can be adjusted in correspondence with personal differences of, e.g., the size of a hand and the length of a finger, a specific way of operation, or the like of an operator. For this reason, the electronic apparatus can be reliably operated.

Furthermore, according to still another embodiment of the present invention, an electronic apparatus comprises display means for displaying an index, operation means used for moving the index displayed by the display means, and adjustment means for adjusting the operation means so that a moving direction of the index displayed by the display means matches a moving direction that an operator intended.

With this arrangement, the moving direction that an operator intended matches the actual moving direction of the index.

According to still another embodiment of the present invention, an operation device for an electronic apparatus, comprises a plurality of switch means, operation means for turning on a predetermined one of the plurality of switch means in correspondence with an operation direction thereof, and changing means for changing a relative positional relationship between the operation direction of the operation means and the switch means to be turned on.

With this arrangement, the relative relationship between the operation direction of the operation means and a switch to be actually turned on can be arbitrarily changed as needed. Thus, the operability of the electronic apparatus can be greatly improved.

Furthermore, according to still another embodiment of the present invention, a image pickup apparatus comprises image pickup means for picking up an object image, operation means used for determining an image pickup condition of the image pickup means, and adjustment means for adjusting an attachment position of the operation means to the image pickup means.

With this arrangement, the attachment position of the operation means can be adjusted to the best one for an operator, thus greatly reducing the load on the image pickup operation.

According to still another embodiment of the present invention, an operation device for an electronic apparatus, comprises operation means which is movable in a plurality of operation directions, a plurality of switch means which are selectively operated in correspondence with the operation direction of the operation means, and changing means for electrically changing a relative positional relationship between the operation directions of the operation means and the plurality of switch means.

With this arrangement, the layout of the operation contents can be modified or the operation contents can be rotated in accordance with a user's favor, thus improving the operability.

According to still another embodiment of the present invention, an image pickup apparatus comprises image pickup means for picking up an image of an object, display means for displaying the image picked up by the image pickup means for a reproduced image, and operation means for moving a display frame, which indicates a setting range of an image pickup condition of the image pickup means on a screen of the display means, to a desired position on the screen, and the operation means is arranged on a plane including the screen of the display means.

With this arrangement, when the image pickup condition is set by the operation means, the operability can be improved. Since the operation means is disposed on a plane including the screen, the image pickup condition can be set with only one finger while confirming the image displayed on the screen. Furthermore, since the operation direction such as the upper, lower, right, or left direction matches the movement of the display frame of the screen, a smooth operation can be realized.

Other objects and features of the present invention will become apparent from the following specification and the accompanying drawings.

BRIEF DESCRIPTION OF THE DRAWINGS

FIG. 6 is a block diagram showing the arrangement of the video camera of the first embodiment;

FIGS. 23A to 23C are views for explaining the method of realizing rotation of switches in a software manner according to the ninth embodiment;

DESCRIPTION OF THE PREFERRED EMBODIMENTS

The preferred embodiments of the present invention will be described hereinafter with reference to the accompanying drawings.

Figure 1:
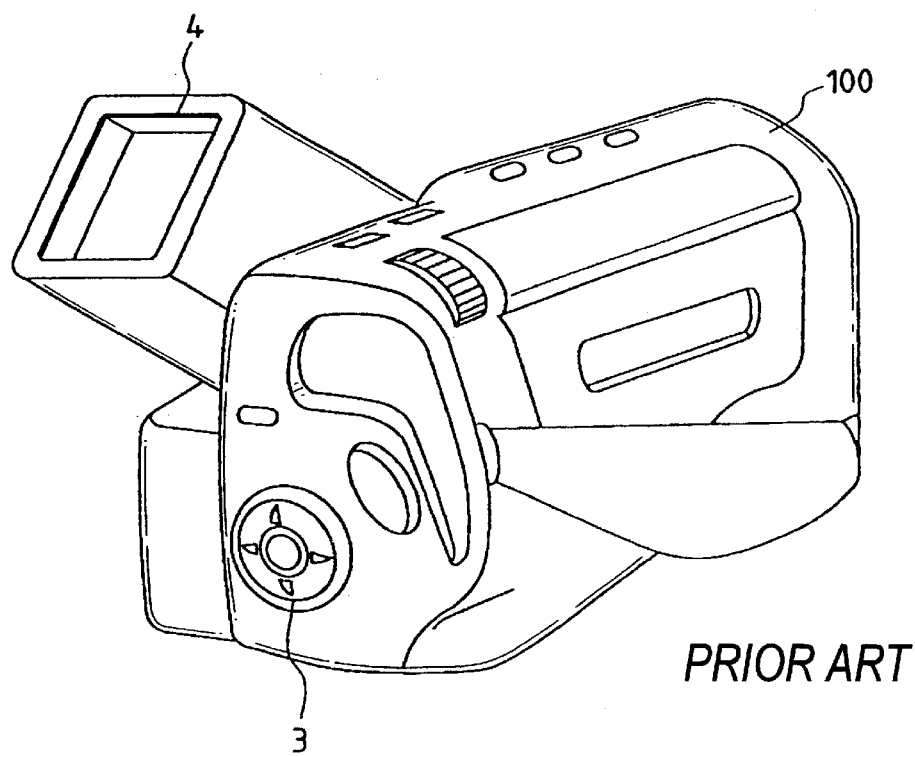
FIG. 1 is a perspective view showing the outer appearance of a conventional video camera.
Figure 2A:
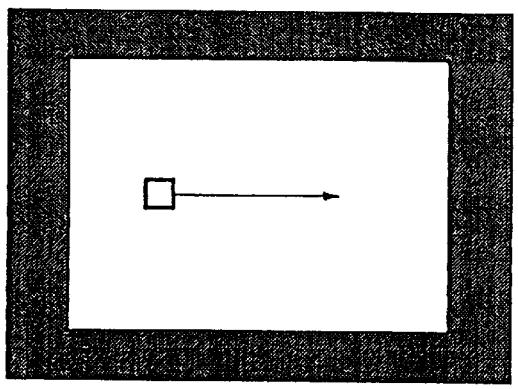
FIGS. 2A and 2B are views showing the movement of a cursor of the video camera.
Figure 2B:
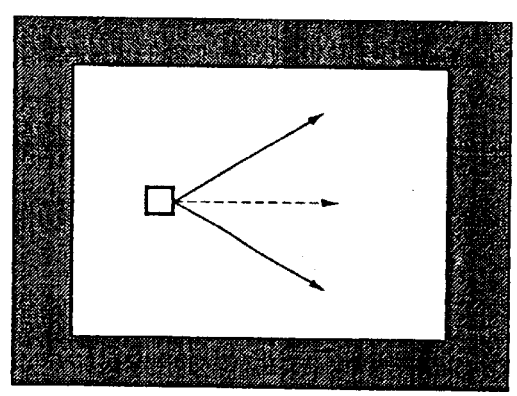
Figure 3:
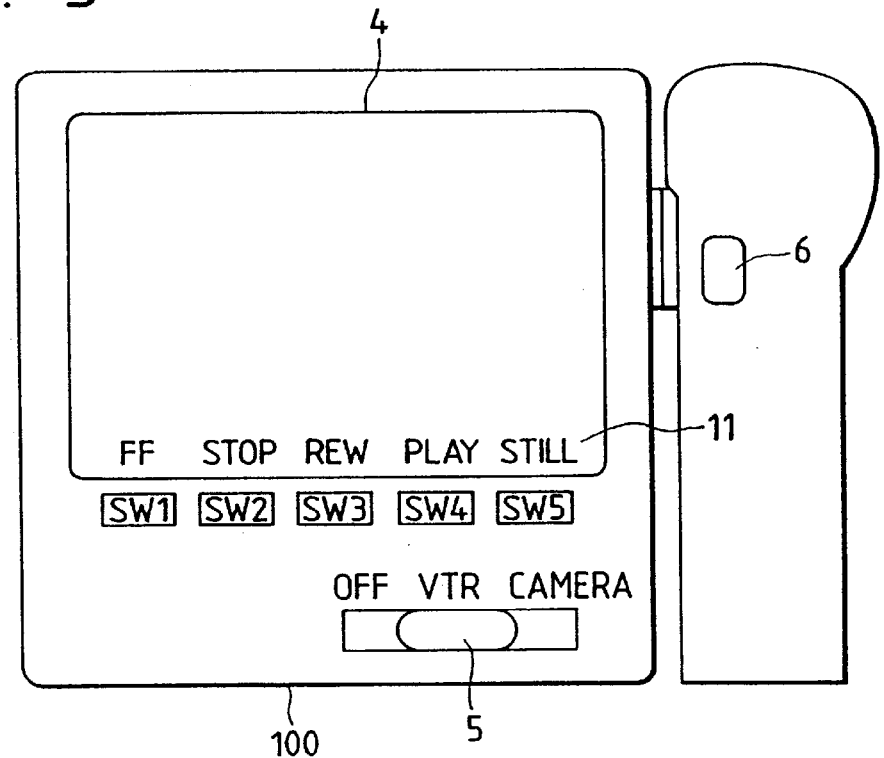
FIG. 3 is a schematic view showing the outer appearance of another conventional video camera.
Figure 4:
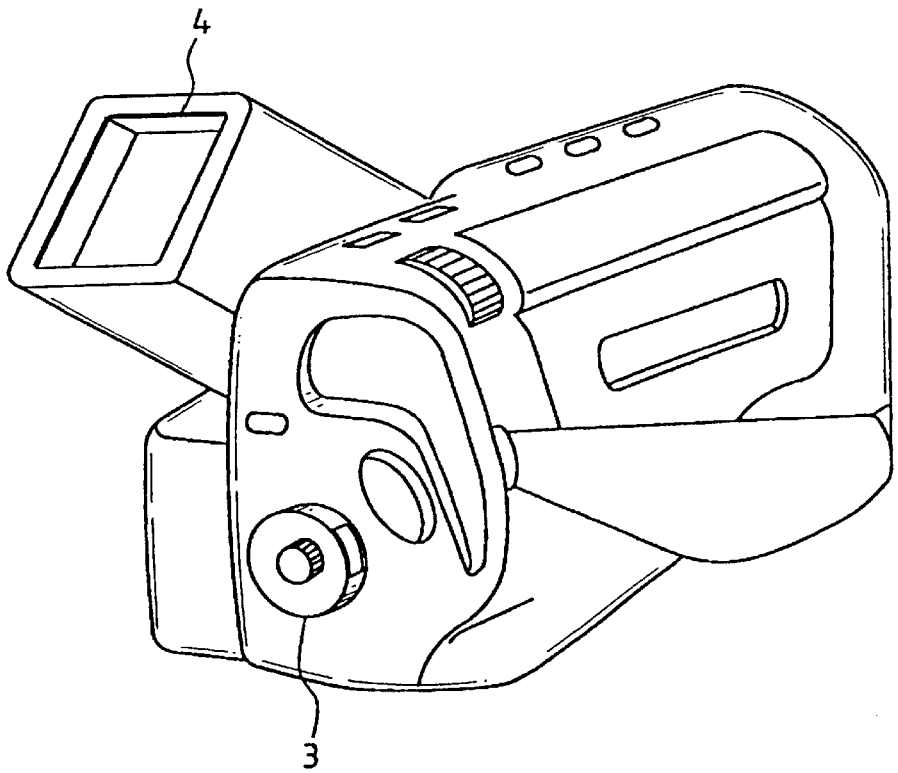
FIG. 4 is a perspective view showing the outer appearance of a video camera according to the first embodiment of the present invention.

FIG. 4 is a perspective view showing the outer appearance of a video camera as an electronic apparatus according to the first embodiment of the present invention. The video camera of this embodiment has substantially the same arrangement as that shown in FIG. 1, except for the structure of a pointing device 3. The structure of the pointing device 3 will be described later. Note that this embodiment exemplifies a video camera. However, the present invention is not limited to this, but may be applied to any other electronic apparatuses.

Figure 5:
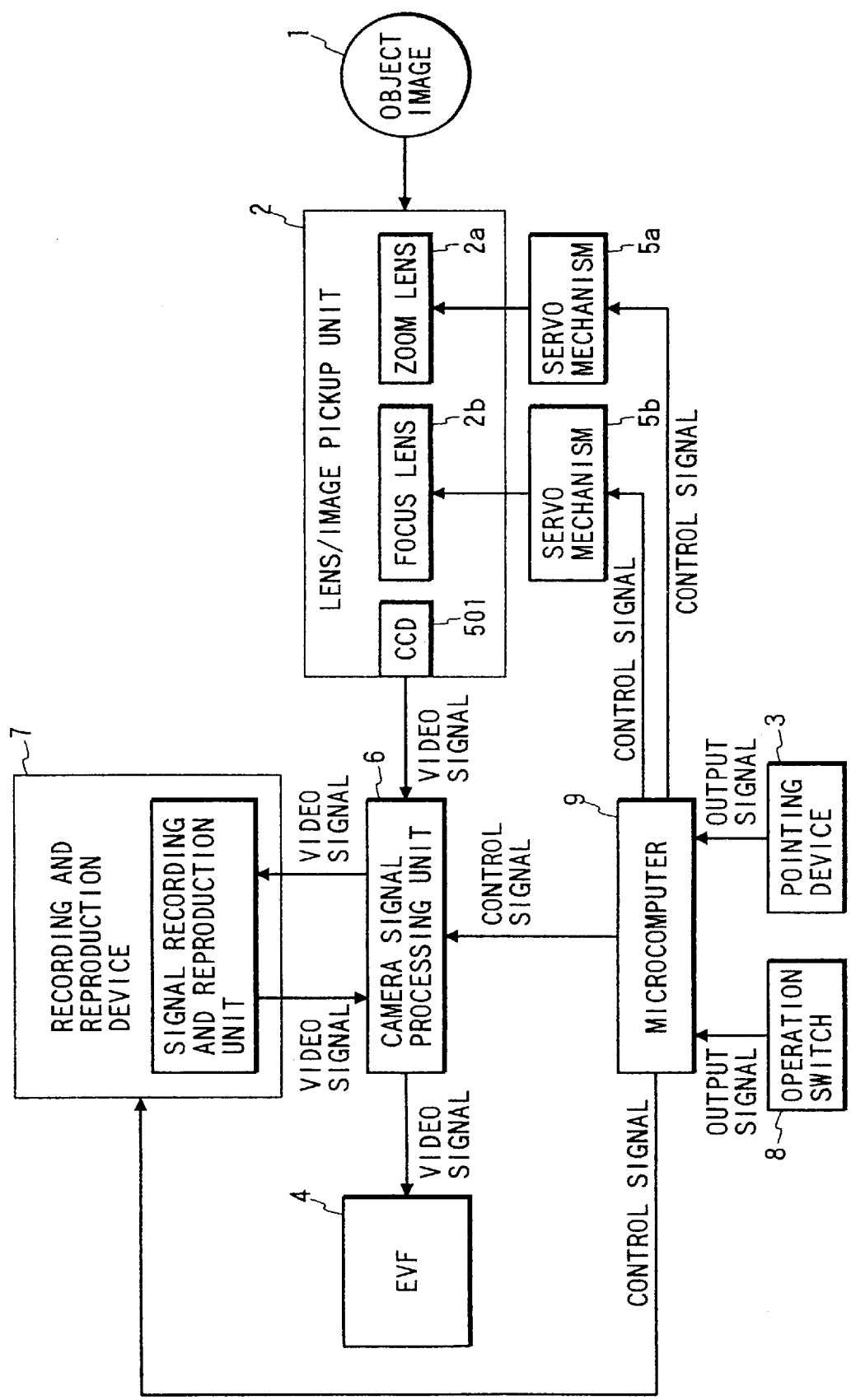
FIG. 5 is a block diagram showing the arrangement of the video camera of the first embodiment.

FIG. 5 is a block diagram showing the system of the video camera, and FIG. 6 is a block diagram showing in detail a camera signal processing unit shown in FIG. 5. More specifically, FIGS. 5 and 6 show the system which controls the position of a cursor as an index upon displaying the position for AF (automatic focal length control) or AE (automatic exposure control) on a display unit of an EVF 4 as display means using the pointing device 3 provided to the video camera. The system will be described below with reference to FIGS. 5 and 6. Note that such an index may be used for other operations in addition to AE and AF.

Referring to FIG. 5, an object image 1 is picked up, and is input to a lens/image pickup unit 2 as image pickup means. A zoom lens 2a and a focus lens 2b in the lens/image pickup unit 2 are driven by servo mechanisms 5a and 5b, which are controlled by a microcomputer 9. A video signal output from the lens/image pickup unit 2 is converted by a camera signal processing unit 6 into a signal to be displayed on the EVF 4 and a signal to be suitably recorded on a magnetic tape, a disk, or the like in a recording and reproduction device 7. A signal output upon operation of the pointing device 3 is input to the microcomputer 9 in parallel with signals output upon operation of other operation switches 8 (a camera operation switch, a recorder operation switch, and the like).

Referring to FIG. 6, upon reception of the output signal from the pointing device 3, the microcomputer 9 discriminates the operation direction of the pointing device 3, and outputs a cursor display/moving command to a character generator 10. The output from the character generator 10 is input to a synthesization (or synthesis) circuit 12. A video signal output from an image pickup unit 2c is subjected to predetermined signal processing in a video signal processing circuit 11, and the processed signal is input to the synthesization circuit 12. The synthesization circuit 12 synthesizes a cursor display signal generated by the character generator 10 and the video signal processed by the video signal processing circuit 11, and the synthesized signal is displayed on the EVF 4. Note that the image pickup unit 2c, the video signal processing circuit 11, the character generator 10, and the synthesization circuit 12 correspond to the camera signal processing unit 6 shown in FIG. 5.

Figure 7A:
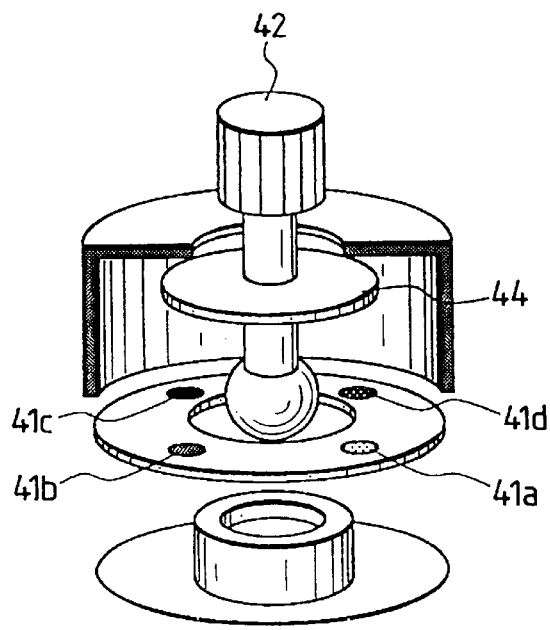
FIGS. 7A and 7B are schematic views showing the structure of a pointing device in the first embodiment.
Figure 7B:
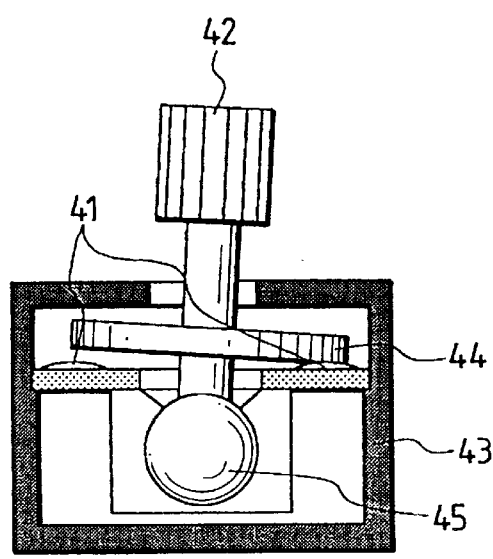

FIGS. 7A and 7B show the structure of the pointing device 3 in the first embodiment. The pointing device 3 of this embodiment is constituted by four tact switches 41 (41a to 41d), a lever 42 which can be tilted in every direction within a certain angle range to have a fulcrum 45 as the center, and a cover 43. A disk-shaped pressing plate 44 is attached to the lever 42 to depress one tact switch 41 when the lever 42 is tilted.

When the lever 42 is tilted in one direction, the pressing plate 44 tilts together and comes into contact with one tact switch 41. When the lever 42 is further tilted, the pressing plate 44 presses the tact switch 41 to turn it on. Note that the tact switches 41 are disposed, so that the four switches are located at the vertices of a cross pattern, and a different switch is depressed and turned on by the pressing plate 44 depending on the tilt direction of the lever 42. In this case, different switch functions are assigned to the four switches.

Figure 8A:
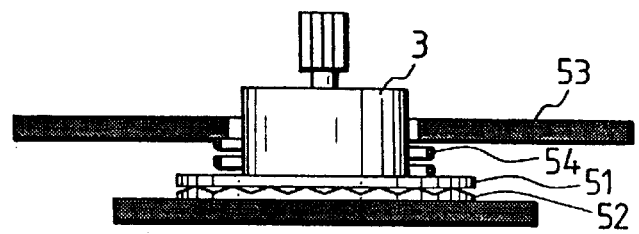
FIGS. 8A to 8C are schematic views showing the arrangement of a pivot mechanism of the pointing device in the first embodiment.
Figure 8B:
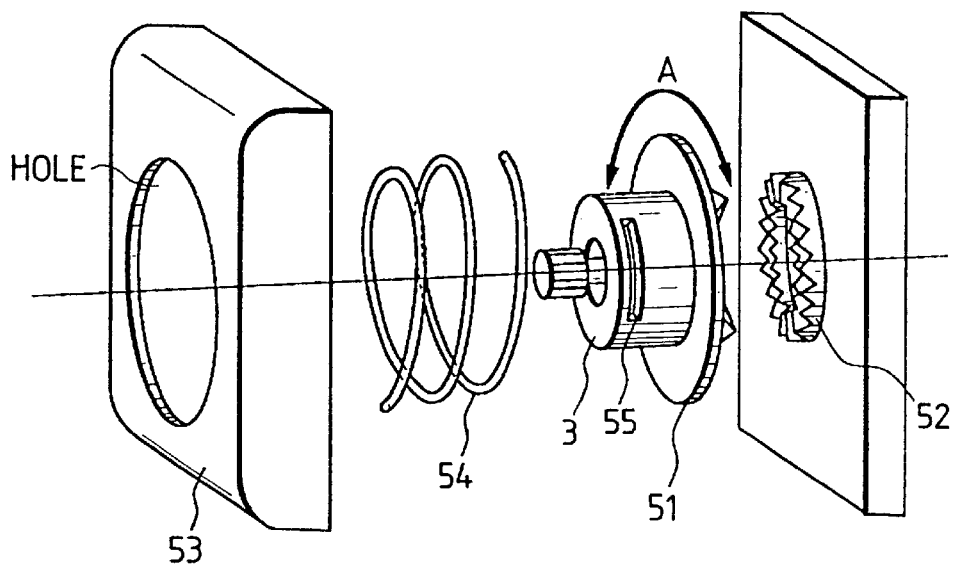

FIG. 8A shows the arrangement of a pivot mechanism as the feature of the pointing device 3 of the first embodiment.

Figure 8C:
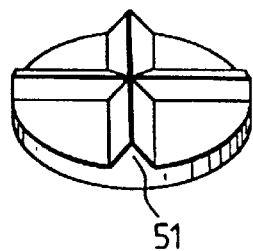

A projection member 51 having a cross-shaped ridge shown in FIG. 8C is attached to the attachment base portion side of the pointing device 3. A recess member 52, which has a crown-gear shape and is formed with a plurality of grooves, is attached to the video camera main body side. In a normal state wherein the ridges of the projection member 51 mesh with the grooves of the recess member 52, as shown in FIG. 8A, the projection member 51 is pressed against the recess member 52 by the biasing force of a spring 54 inserted between an outer cover 53 and the projection member 51, thus fixing the position of the pointing device 3.

When the pointing device 3 is pulled up from the fixed state against the biasing force of the spring 54 by hooking a pawl 55 formed on the pointing device 3, the ridges of the projection member 51 disengage from the grooves of the recess member 52, and the pointing device 3 is free to rotate about its central axis, as indicated by a double-headed arrow A. When the pointing device 3 is released at an arbitrary position in a state wherein the pointing device 3 is free to rotate, the projection member 51 is pressed against the recess member 52 by the biasing force of the spring 54 again, and the ridges of the projection member 51 mesh with the grooves, different from those meshed previously, of the recess member 52, thus fixing the pointing device 3 in position again. In this embodiment, the projection member 51, the recess member 52, the spring 54, and the pawl 55 constitute adjustment means.

As described above, according to this embodiment, since the pointing device 3 is pivotal with respect to the apparatus main body, and can be fixed at an optimal position where the directions that an operator intended match the movements of the cursor, the operator can desirably perform the movement of the cursor and selection of a menu item without impairing the operability depending on the size of the hand and the length of the finger of the operator or the way of holding the camera. Note that the structure of the pointing device 3 is not limited to one described in this embodiment.

Figure 9:
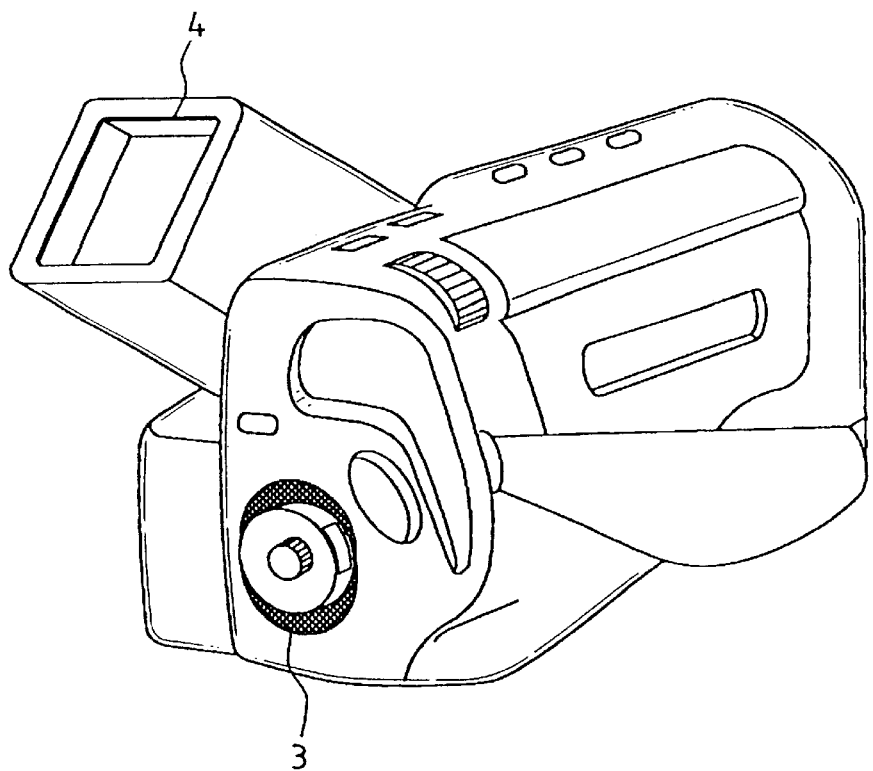
FIG. 9 is a perspective view showing the outer appearance of a video camera according to the second embodiment of the present invention.

FIG. 9 is a perspective view showing the outer appearance of a video camera according to the second embodiment of the present invention. The video camera of this embodiment has substantially the same arrangement as that of the conventional camera shown in FIG. 1, except for the structure of a pointing device 3. The structure of the pointing device 3 will be described later.

Figure 10A:
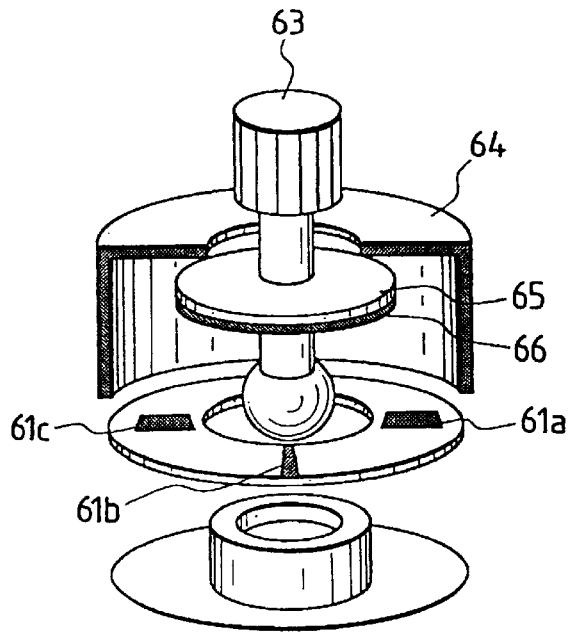
FIGS. 10A and 10B are schematic views showing the structure of a pointing device in the second embodiment.
Figure 10B:
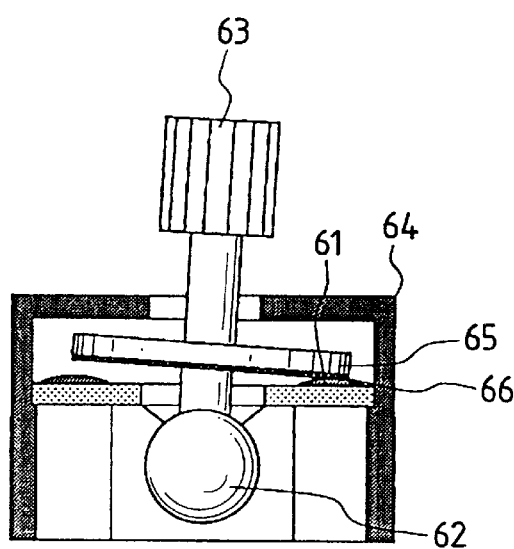

FIGS. 10A and 10B show the structure of the pointing device 3 of this embodiment. The pointing device 3 shown in FIGS. 10A and 10B is constituted by four switch contacts 61 (61a to 61d), a lever 63 which can be tilted in every direction within a certain angle range to have a fulcrum 62 as the center, and a cover 64, and a disk-shaped pressing plate 65 is attached to the lever 63. When the lever 63 is tilted in one direction, the pressing plate 65 tilts together, and a contact 66 formed on the pressing plate 65 comes into contact with and electrically connected to one of the switch contacts 61, thus turning on a switch. The switch contact to be turned on by contact varies depending on the tilt direction of the lever 63, and different switch functions are assigned to the four switch contacts in this case as well.

Figure 11A:
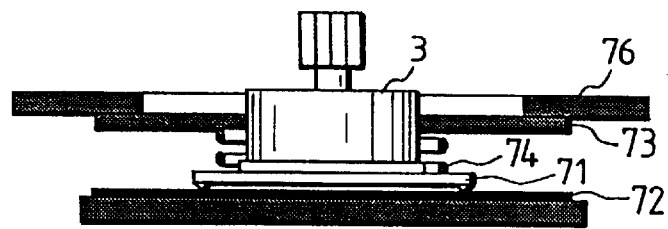
FIGS. 11A to 11C are schematic views showing the arrangement of a slide mechanism of the pointing device in the second embodiment.
Figure 11B:
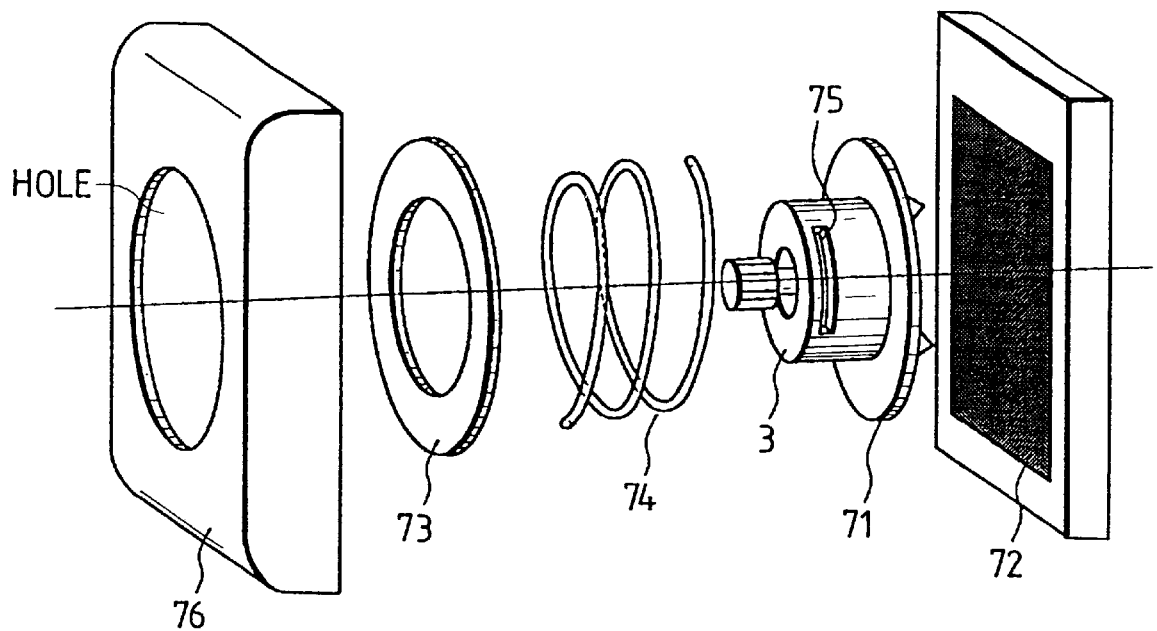
Figure 11C:
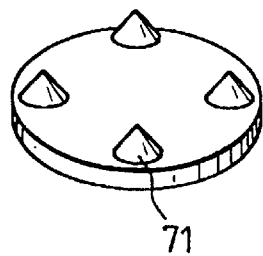

FIGS. 11A to 11C show the arrangement of a slide mechanism as the feature of the pointing device 3 according to the third embodiment of the present invention.

Referring to FIG. 11B, a projection member 71 having some conical projections shown in FIG. 11C is attached to the attachment base portion side of the pointing device 3. A rubber sheet 72 is attached to the video camera main body side. By the biasing force of a spring 74 inserted between a pressing plate 73 and the projection member 71, the projections of the projection member 71 are pressed against the rubber sheet 72, so that the pointing device 3 does not inadvertently move, thus fixing the pointing device 3 in position.

From this fixing state, when the pointing device 3 is perpendicularly pulled up against the biasing force of the spring 74 by hooking a pawl 75 formed on the pointing device 3, the projections of the projection member 71 are released from the rubber sheet 72, and the pointing device 3 becomes free to translate within the area of the opening portion of an outer cover 76.

In a state wherein the pointing device 3 is free to translate, the pointing device 3 is moved to an arbitrary position together with the pressing plate 73 and the spring 74, and thereafter, is released. As a result, the projection member 71 is pressed against the rubber sheet 72 again by the biasing force of the spring 74, and the projections of the projection member 71 presses against the rubber sheet 72, thus fixing the pointing device 3 at a new position. In this embodiment, the projection member 71, the rubber sheet 72, the pressing plate 73, the spring 74, and the pawl 75 constitute adjustment means.

As described above, according to this embodiment, since the pointing device is slidable within the range in which the pointing device does not protrude from the video camera, the pointing device does not disturb the holding operation of the camera, and an image pickup operation can be performed at the position, suitable for an operator, of the pointing device.

Note that the system arrangement of the video camera main body and the arrangement of the cursor display system of this embodiment are the same as those shown in FIGS. 5 and 6 in the first embodiment, and a detailed description thereof will be omitted.

This embodiment exemplifies the slide mechanism of the pointing device. However, the present invention is not limited to this. For example, switches of other forms may be slidably arranged. Furthermore, in this embodiment, since no mechanical structure for restricting rotation of the pointing device 3 about its central axis is arranged, the pointing device may be moved by rotating it.

Figure 12:
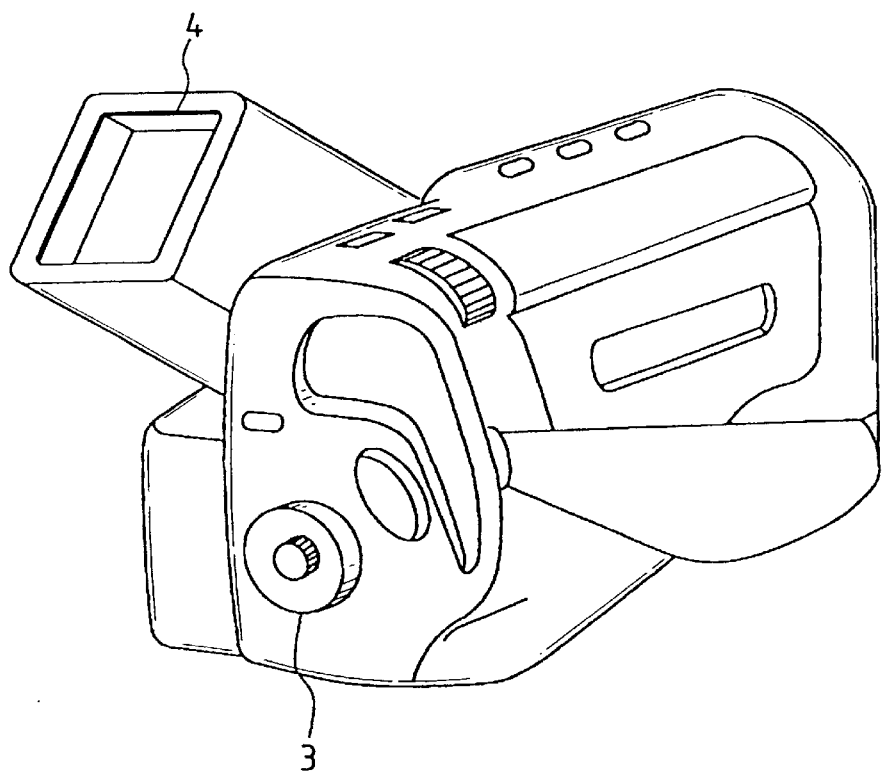
FIG. 12 is a perspective view showing the outer appearance of a video camera according to the third embodiment of the present invention.

FIG. 12 is a perspective view showing the outer appearance of a video camera according to the third embodiment of the present invention. The video camera of this embodiment has substantially the same arrangement as that shown in FIG. 1, except for the structure of a pointing device 3. The structure of the pointing device 3 will be described later.

FIGS. 13A to 13D show the arrangement of a tilt mechanism of the pointing device 3 in the third embodiment of the present invention.

Figure 13A:
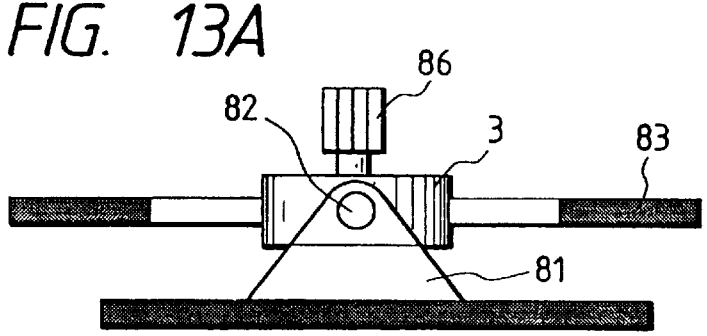
FIGS. 13A to 13D are schematic views showing the arrangement of a tilt mechanism of a pointing device in the third embodiment.
Figure 13B:
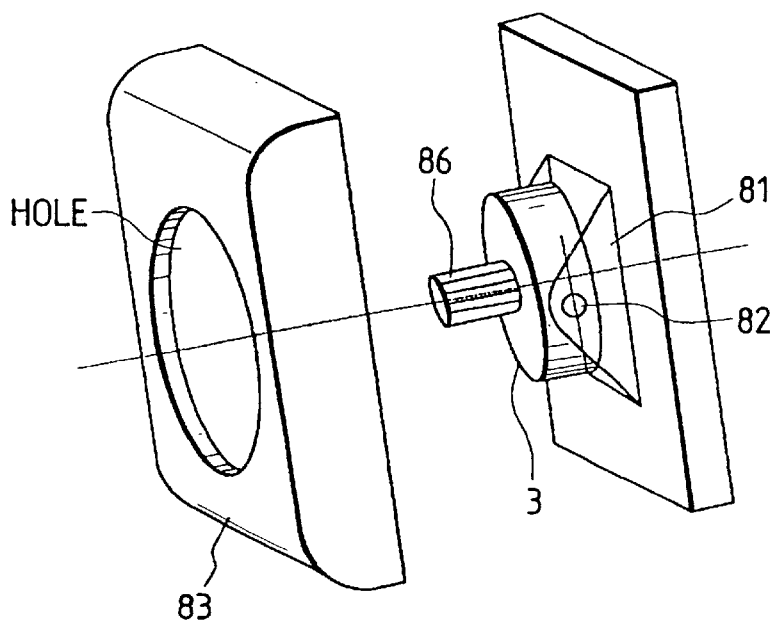
Figure 13C:
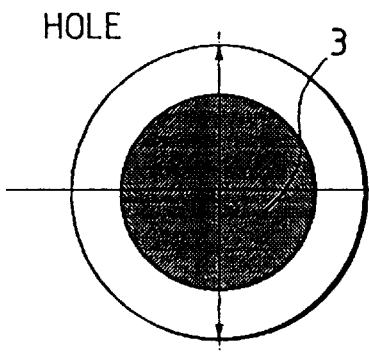
Figure 13D:
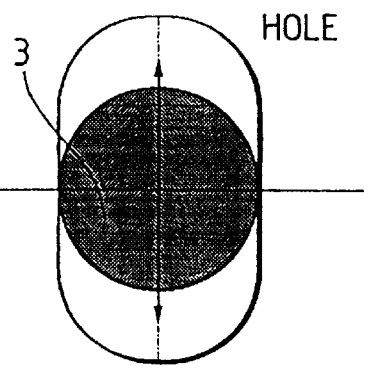

Referring to FIGS. 13A to 13D, the pointing device 3 is attached to a U-shaped base 81, attached to the video camera main body, via a rotation shaft 82 extending in a direction perpendicular to the central axis of a lever 86. The pointing device 3 is pivotal about the shaft 82. A hole having a diameter larger than the outer diameter of the pointing device is formed on an outer cover 83, as shown in FIGS. 13C and 13D. The pointing device 3 is swung in directions determined by the mechanism within the range of the hole, and can be fixed at the position of an arbitrary attachment angle. For example, a screw may be provided to the rotation shaft 82, so that the screw is loosened when the attachment angle is changed, and is tightened in other states, thereby fixing the pointing device 3. In this embodiment, the base and the rotation shaft 82 constitute adjustment means.

With this arrangement, the attachment angle of the operation means can be adjusted in correspondence with the size of the hand, the length of the finger, a specific way of operation, or the like of an operator.

Note that the system arrangement of the video camera main body and the arrangement of the cursor display system of this embodiment are the same as those shown in FIGS. 5 and 6 in the first embodiment, and a detailed description thereof will be omitted. Also, the structure of the pointing device 3 is the same as that shown in FIGS. 7A and 7B or FIGS. 10A and 10B in the first or second embodiment, and a detailed description thereof will be omitted.

Figure 14A:
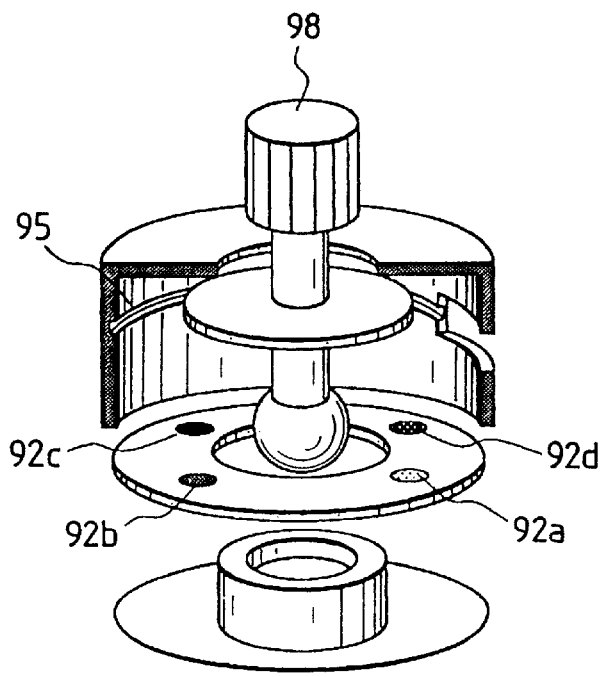
FIGS. 14A and 14B are schematic views showing the structure of a pointing device according to the fourth embodiment of the present invention.
Figure 14B:
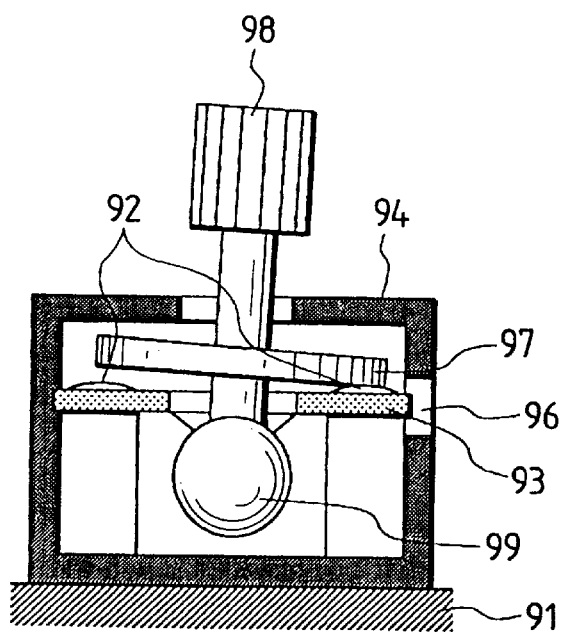

FIGS. 14A and 14B show the structure of a pointing device according to the fourth embodiment of the present invention. Unlike in the first to third embodiments in which the pointing device itself is movable, the pointing device of this embodiment has its base portion fixed to an apparatus main body 91, and its position relative to the apparatus main body does not change. A circuit board 93 is disposed inside the pointing device 3 and has tact switches 92 (92a to 92d). The circuit board 93 is fitted in an attachment groove 95 formed on the inner wall of a cover 94. The cover 94 has a window 96 with an appropriate size, so that a portion of the circuit 93 is externally exposed therefrom.

The circuit board 93 is slidable with respect to the attachment groove 95, and can be rotated inside the pointing device 3 when the portion of the circuit board 93 exposed from the window 96 is moved. In this manner, when the circuit board 93 is rotated to change the relative positional relationship between the tact switches 92 and the apparatus main body 91, the relative positional relationship between the operation directions of a lever 98 of the pointing device 3 and the switches to be turned on can be changed. Even when the positions of the tact switches 92 are changed by rotating the circuit board 93, since a pressing plate 97 has a disk shape, it can depress the tact switch 92 by a corresponding peripheral portion when the lever 98 is tilted. In this embodiment, the pressing plate 97 and the lever 98 constitute operation means, and the circuit board 93, the attachment groove 95, and the window 96 constitute changing means.

As described above, in this embodiment, although the pointing device itself is fixed to the apparatus main body, the positions of the tact switches can be changed in the device, thereby improving the operability of the pointing device.

Note that the system arrangement of the video camera main body and the arrangement of the cursor display system of this embodiment are the same as those shown in FIGS. 5 and 6 in the first embodiment, and a detailed description thereof will be omitted.

Figure 15A:
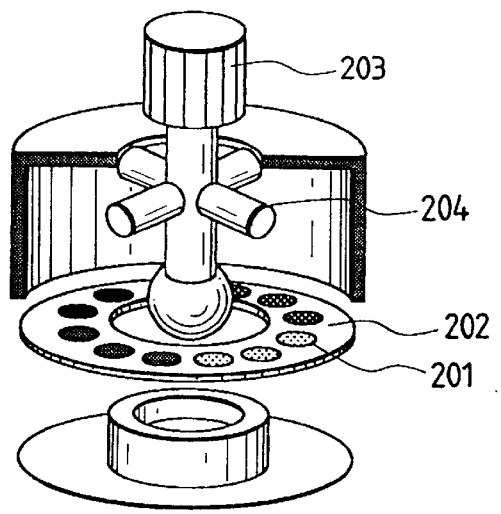
FIGS. 15A to 15C are schematic views showing the structure of a pointing device according to the fifth embodiment of the present invention.
Figure 15B:
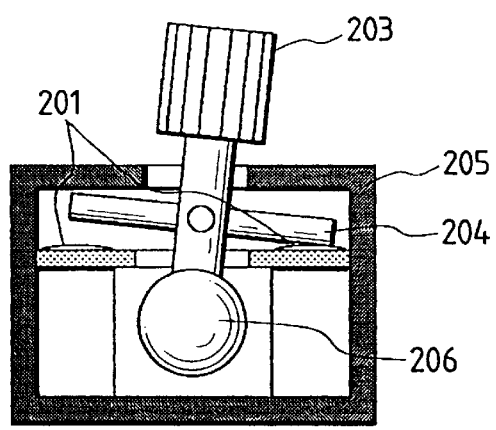
Figure 15C:
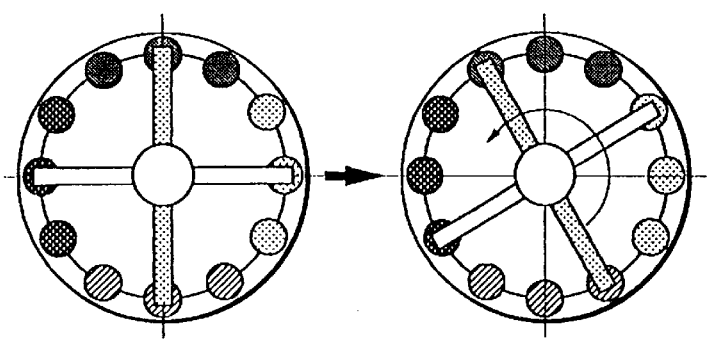

FIGS. 15A to 15C show the structure of a pointing device according to the fifth embodiment of the present invention. The pointing device of this embodiment has its base portion fixed to an apparatus main body, and its position relative to the apparatus main body does not change. As shown in FIGS. 15A to 15C, the pointing device 3 incorporates 12 tact switches 201, which are arranged at equal angular intervals on a single perimeter of a board 202. Of the 12 tact switches, each three switches correspond to the same operation purposes (the switches having the same operation purposes are indicated by the same patterns in FIG. 15C), and four sets of tact switches, each set including three switches corresponding to the same operation purpose, are incorporated in the pointing device 3 to be arranged in turn.

Arms 204 for pressing the tact switches 201 extend in a cross pattern from a lever 203, and can press the tact switches of different operation purposes. In order to change the relative positional relationship between the operation directions of the lever 203 and the switches to be turned on in the above arrangement, the lever 203 is rotated about its central axis to select a switch to be pressed by the arm 204 from the three tact switches 201 having the same operation purpose. In this manner, the relative positional relationship between the operation directions of the lever 203 and the switches to be turned on can be changed in correspondence with the three switches. In this embodiment, the lever 203, the arms 204, and a fulcrum 206 constitute operation means and changing means.

As described above, even when the lever 203 is rotated, the arms 204 have a one-to-one correspondence with the tact switches 201 having different operation purposes, and the four operation directions can attain functions of different operation purposes who do not overlap each other.

Figure 16A:
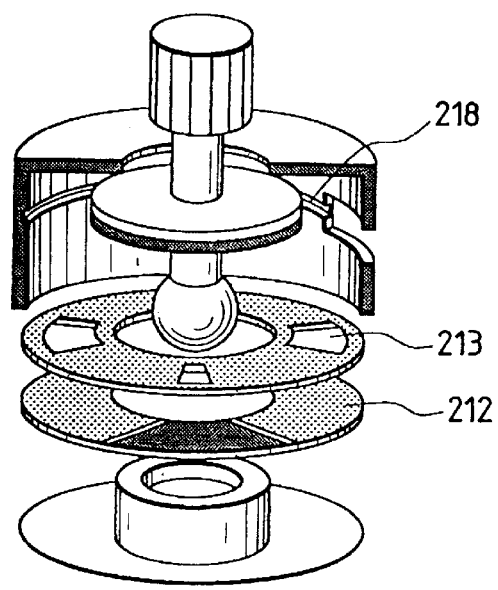
FIGS. 16A to 16C are schematic views showing the structure of a pointing device according to the sixth embodiment of the present invention.
Figure 16B:
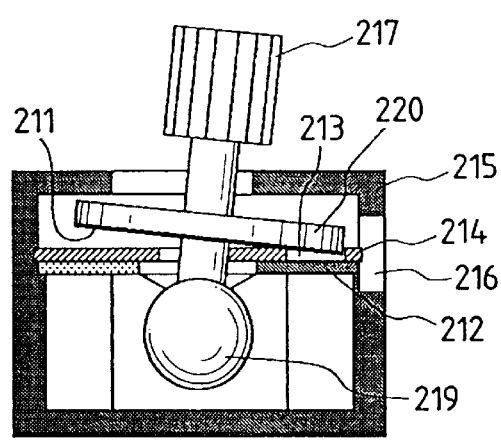
Figure 16C:
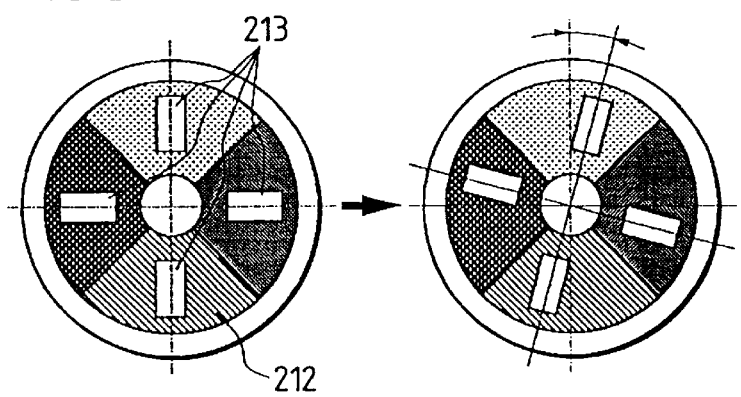

FIGS. 16A to 16C show the structure of a pointing device according to the sixth embodiment of the present invention. The pointing device of this embodiment has its base portion fixed to an apparatus main body, and its position relative to the apparatus main body does not change. As shown in FIGS. 16A to 16C, in the pointing device 3, an insulating sheet 214 with four notches 213 is inserted between contacts 211 and 212, and the contacts 211 and 212 contact via one of the notches 213, and are electrically connected to each other, thereby turning on a corresponding switch.

Since the insulating sheet 214 is slidably attached to an attachment groove 218 formed on the inner wall of a cover 215, it is rotatable about the central axis of a lever 217. When a portion of the insulating sheet 214, which is exposed from a window 216 formed on the cover 215, is moved to rotate the insulating sheet 214, the positions of the notches 213 with respect to the contact 212 change to change the positions where the contacts 211 and 212 contact each other and are electrically connected to each other, thereby changing the relative positional relationship between the operation direction of the lever and switches to be turned on. In this embodiment, the lever 217, a pressing plate 220, and a fulcrum 219 constitute operation means, and the insulating sheet 214 and the window 216 constitute changing means.

Figure 17A:
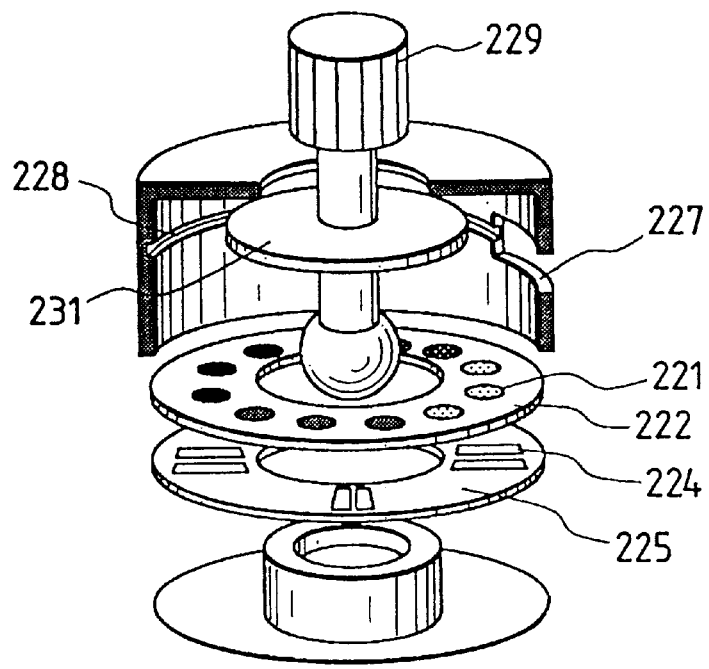
FIGS. 17A and 17B are schematic views showing the structure of a pointing device according to the seventh embodiment of the present invention.
Figure 17B:
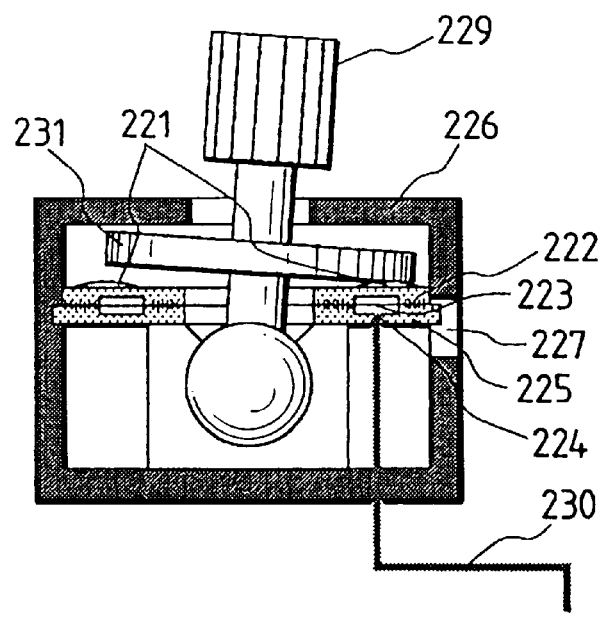

FIGS. 17A and 17B show the structure of a pointing device according to the seventh embodiment of the present invention. The pointing device of this embodiment has its base portion fixed to an apparatus main body, and its position relative to the apparatus main body does not change. As shown in FIGS. 17A and 17B, 12 tact switches 221 are arranged at equal angular intervals on a single perimeter of a switch board 222, and switch terminals 223 of the tact switches 221 are exposed to the rear surface of the switch board 222.

A contact board 225 on which four contact terminals 224 are arranged is stacked under the switch board 222. A portion of the contact board 225 is exposed from a window 227 formed on a cover 226, and the contact board 225 itself is slidably attached to a groove 228 on the inner wall of the cover. Thus, when the portion of the contact board 225, which is exposed from the window 227, is moved, the board 225 can be rotated about the central axis of a lever 229. Output signal lines 230 extend from the terminals 224 on the contact board 225 toward a portion outside the pointing device 3.

The tact switches 221 on the switch board 222 are independent from each other, and have no electrical contact with an external portion. When the switch board 222 and the contact board 225 are stacked on each other, and the switch terminal 223 contacts the terminal 224 on the contact board 225, only a corresponding switch has an electrical contact with an external portion.

Since the contact board 225 is rotatable, the tact switches to be operated by pressing of a pressing plate 231 when the lever 229 is tilted can be selected by rotating the contact board 225 to change the switch terminals 223 which contact the contact terminals 224 on the contact board, thereby changing the relative positional relationship between the operation directions of the lever 229 and the switches to be turned on. In this embodiment, the lever 229 and the pressing plate 231 constitute operation means, and the contact board 225, the window 227, and the attachment groove 228 constitute changing means.

Figure 18A:
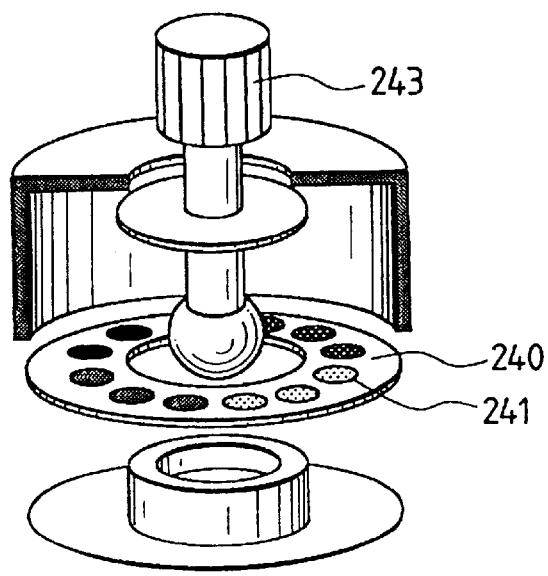
FIGS. 18A and 18B are schematic views showing the structure of a pointing device according to the eighth embodiment of the present invention.
Figure 18B:
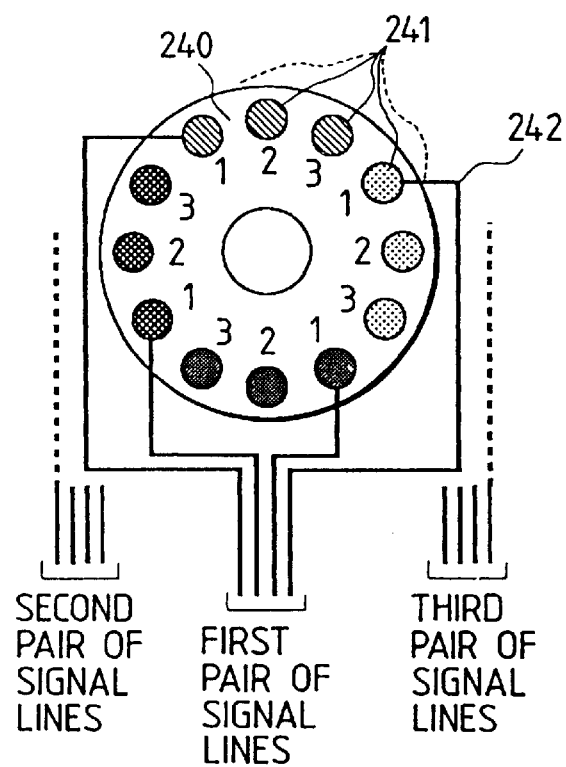

FIGS. 18A and 18B show the structure of a pointing device according to the eighth embodiment of the present invention. The pointing device of this embodiment has its base portion fixed to an apparatus main body, and its position relative to the apparatus main body does not change. As shown in FIGS. 18A and 18B, the pointing device has 12 switch contacts 241, which are arranged at equal angular intervals on a single perimeter on a board. Of the 12 switch contacts 241, each three switches correspond to the same operation purpose, and four sets each consisting of three switches are arranged adjacent to each other.

In the pointing device 3 of this embodiment, four sets of switch contacts 241 corresponding to the same operation purposes are sequentially arranged on a single perimeter. Signal lines 242 extend from the switch contacts 241 toward an external portion. As shown in FIGS. 18A and 18B, the signal lines extending from a total of four terminals which output signals for different purposes and are arranged at equal angular intervals are bundled outside the pointing device. In this embodiment, three sets (pairs) of signal lines are formed. Of the sets of signal lines for outputting signals for the same purpose in the respective sets of signal lines, a set to be electrically connected to an external portion is arbitrarily selected by changing means, thereby selecting a set of switch contacts 241 whose operations can be detected. Therefore, the relative positional relationship between the operation directions of a lever 243 and the switches to be turned on can be changed.

Figure 19A:
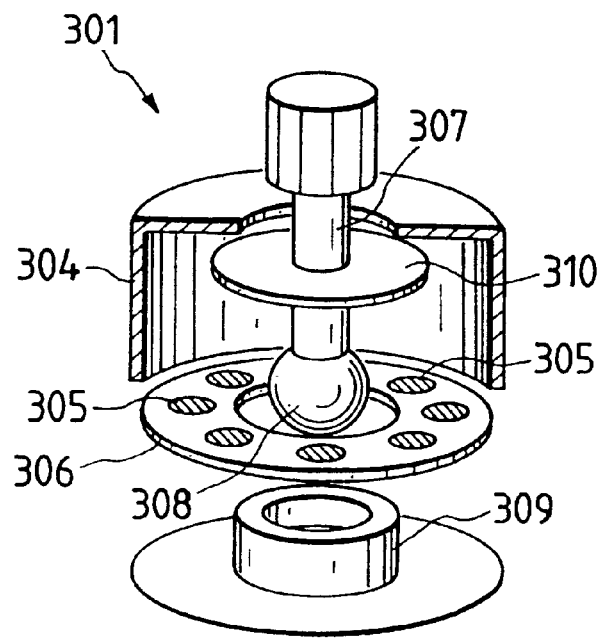
FIGS. 19A and 19B are respectively an exploded perspective view and a side sectional view of a pointing device according to the ninth embodiment of the present invention.
Figure 19B:
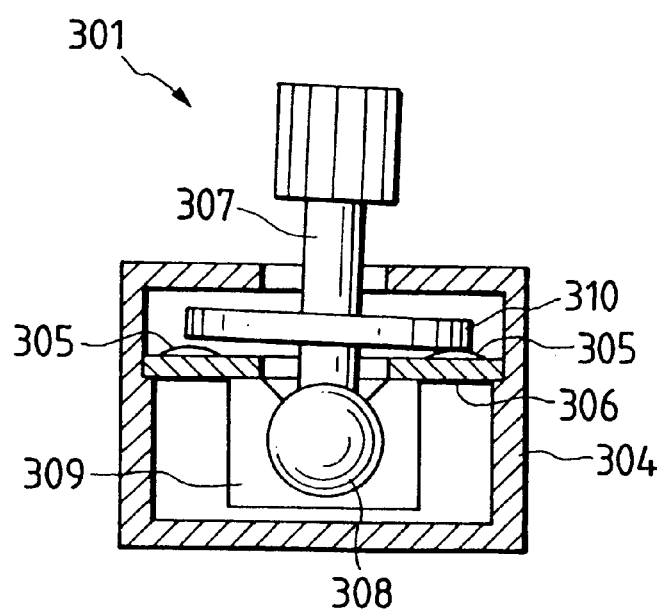

FIGS. 19A and 19B are respectively a perspective view and a side sectional view showing the arrangement of a pointing device according to the ninth embodiment of the present invention.

Referring to FIGS. 19A and 19B, in a cover 304, a switch plate 306 on which eight tact switches 305 are arranged on a single perimeter is arranged, and an operation lever 307 is supported by a support member 308 having a spherical shape. The support member 308 is pivotally held by a holding member 309. A disk-shaped pressing plate 310 for pressing the tact switch 305 is arranged on the operation lever 307.

With the above arrangement, the operation lever 307 can be tilted in 360° directions within a predetermined angle range to have the support member 308 as a fulcrum. When an operator tilts the operation lever 307 in a certain direction, the pressing plate 310 also tilts, and one of the tact switches 305, corresponding to the operation direction, is pressed and turned on by the pressing plate 310. Therefore, by selecting the tilt direction (operation direction) of the operation lever 307, one of the eight tact switches 305 can be selectively turned on.

Note that different switch functions are assigned to the eight tact switches 305. In the following description, the eight tact switches 305 will be referred to as switches SW1, SW2, . . . , SW8, as needed.

Since the arrangement of a video camera 100 using a pointing device 301 described above is the same as that shown in FIG. 5, a detailed description thereof will be omitted.

Figure 20:
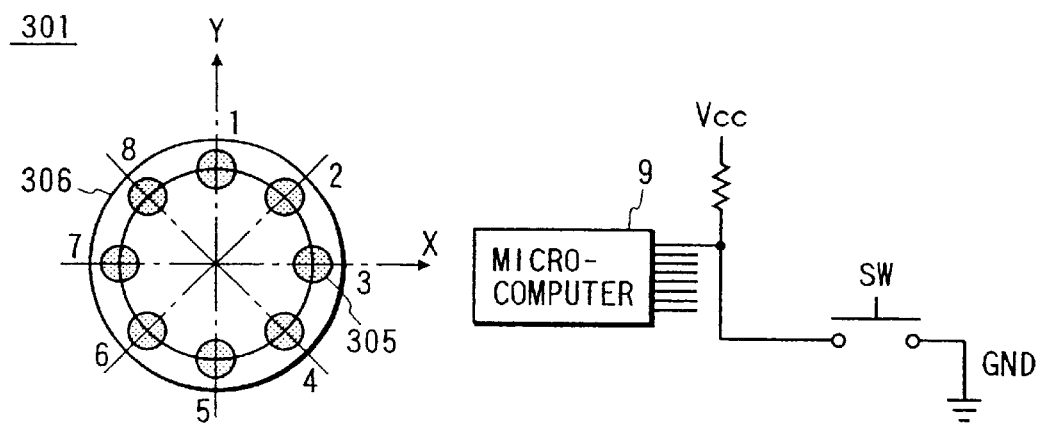
FIG. 20 is a circuit diagram of the pointing device.

FIG. 20 is a circuit diagram of the pointing device 301.

Referring to FIG. 20, when one of the tact switches 305 is depressed, the switch SW shown in FIG. 20 is turned on and grounded, and an L-level output signal is supplied to a microcomputer 9. Since the switch SW includes eight switches SW1 to SW8, the microcomputer 9 always sequentially samples the output signals from these eight switches at a predetermined cycle. The sampling results (H level or L level) are sequentially stored in an 8-bit register.

Figure 21:
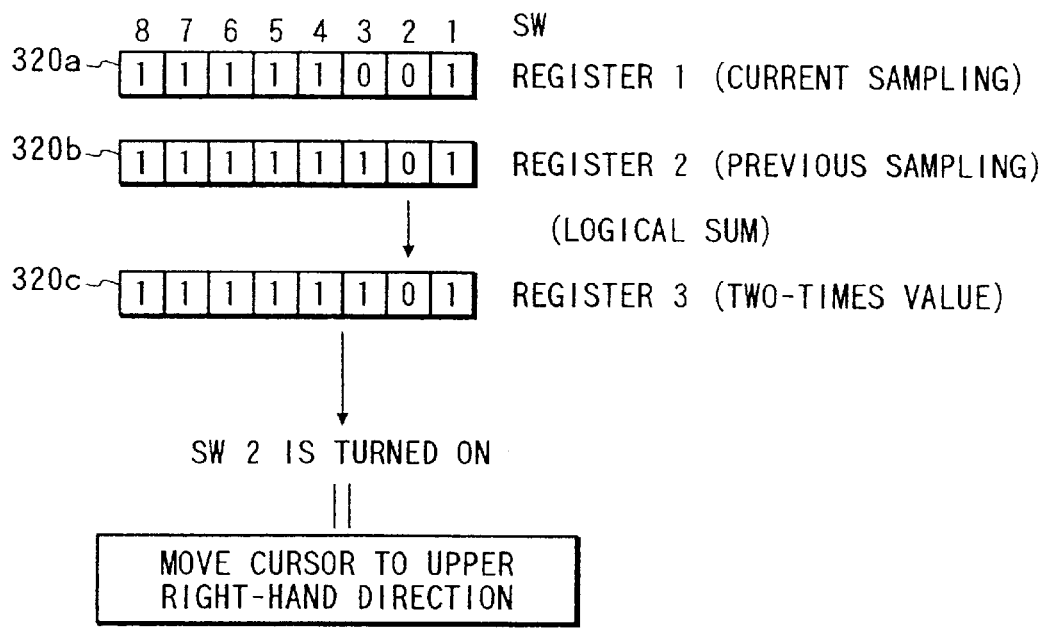
FIG. 21 is a view for explaining the method of discriminating a depressed switch.

FIG. 21 shows the contents of a register 320 as a result of the sampling. The current sampling results are stored in a register 320a, and the previous sampling results are stored in a register 320b. Then, the contents of the registers 320a and 320b are logically ORed in units of bits, and the results are stored in a register 320c. In the example shown in FIG. 21, since the second bit corresponds to L level (0) with reference to the contents of the register 320c, it is determined that the switch SW2 is ON. As a result, the microcomputer 9 controls a character generator 10 to generate a cursor which moves in the upper right-hand direction.

Figures 22A, 22B:
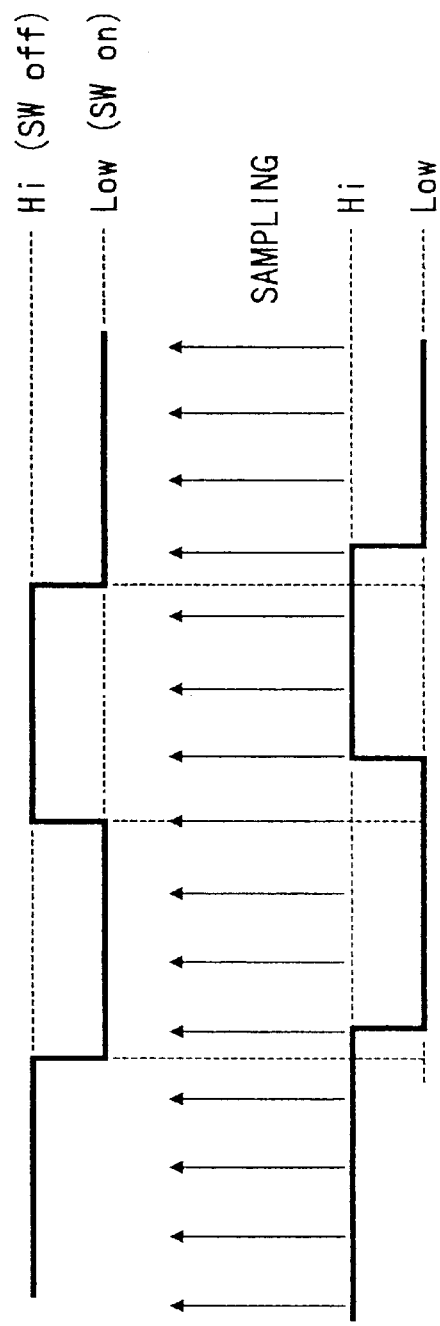
FIGS. 22A and 22B are timing charts showing the operation for sampling the switch state.

By repeating the series of processing operations described above, the waveform of the output signal from a given tact switch 305 shown in FIG. 22A finally becomes one shown in FIG. 22B. In FIG. 22B, when the signal is at L level, the microcomputer 9 performs processing corresponding to the ON tact switch 305.

In the pointing device 301 according to the above-mentioned embodiment, the relative positional relationship between the operation directions of the levers 307 and the switches SW1 to SW8 can be changed in a software manner.

FIGS. 23A to 23C are views for explaining the changing operation.

In FIGS. 23A to 23C, an 8-bit flag register 321 is arranged, and the contents of the register 320c (see FIG. 21) are rotated in the right- or left-hand direction with reference to the contents of the register 321.

In the case of FIG. 23A, since all the bits of the flag register 321 are at L level, no rotation is performed, and it is determined in accordance with the contents (the first bit is "0" in FIG. 23A) of the register 320c that the switch SW1 is ON, thus moving a cursor on a monitor 4 in the upper direction.

In the case of FIG. 23B, since the first bit of the flag register 321 is "1", the contents of the register 320c are rotated by one bit in the right-hand direction, as indicated by a register 320d. With this processing, a bit "0" corresponding to the switch SW2 corresponds to the switch SW1. As a result, when the switch SW2 is depressed, the cursor is moved in the direction assigned to the switch SW1. More specifically, when the switch SW2 for normally moving the cursor in the upper right-hand direction is depressed, the cursor is moved in the upper direction.

In the case of FIG. 23C, since the second bit of the flag register 321 is "1", the contents of the register 320c are rotated by one bit in the left-hand direction to obtain the contents of the register 320d. As a result, when the switch SW8 is depressed, the cursor is moved in the direction assigned to the switch SW1.

As described above, since the contents of the register 320c are rotated by at least one bit in accordance with the position of "1" in the flag register 321, the switches SW1 to SW8 can be substantially replaced by other switches.

With this processing, an operator can change the layout of the switches SW1 to SW8 to one that he or she can most easily operate, in correspondence with the size of the hand, the length of the finger, the holding position of the video camera 100, or the like.

Figure 24:
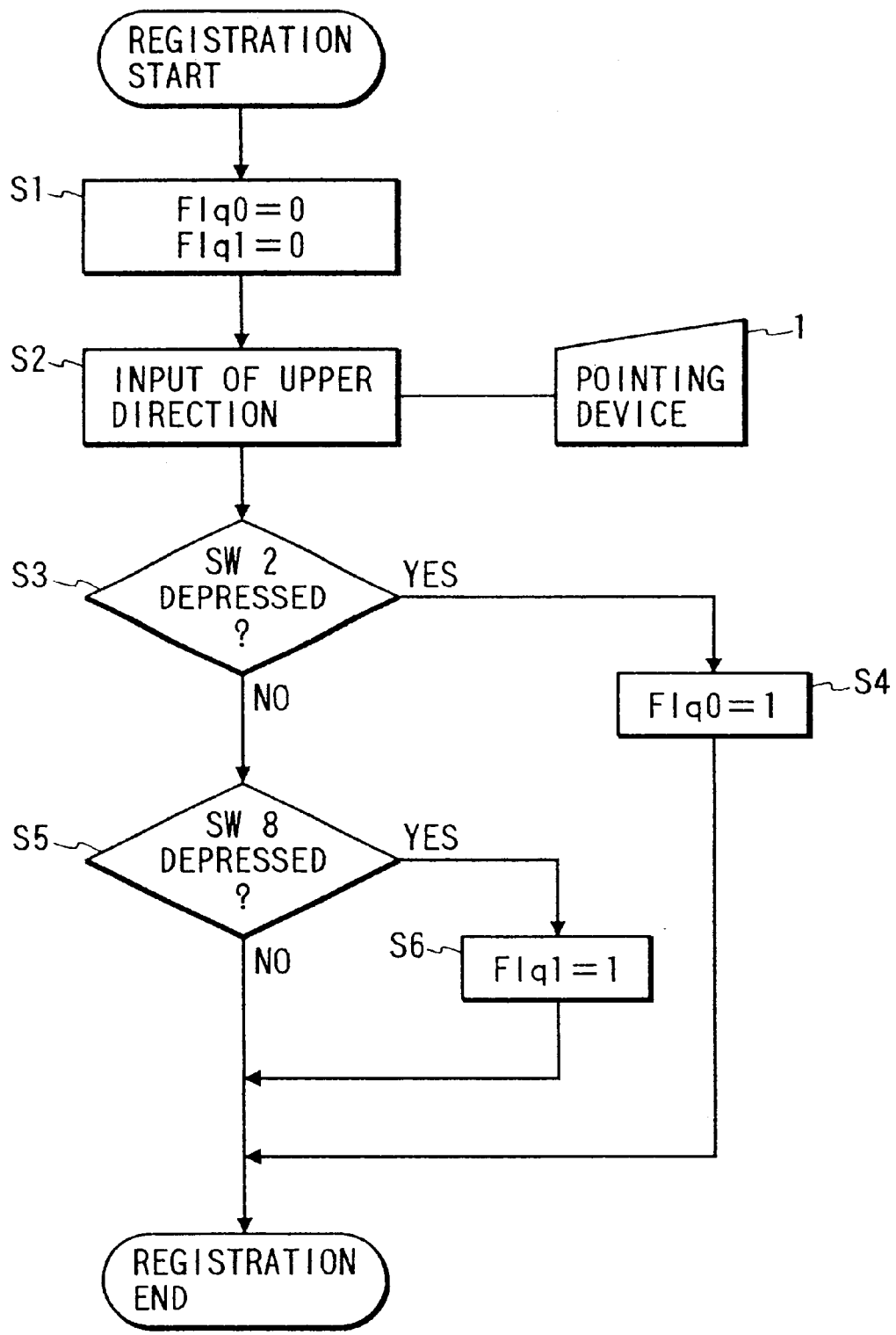
FIG. 24 is a flow chart showing the operation for registering a rotation of the switches.

FIG. 24 is a flow chart showing the operation for registering a flag in the flag register 321.

In step S1, both flags 0 and 1 are set to be "0". In step S2, the pointing device 301 is operated to move the cursor in the upper direction (the Y direction in FIGS. 23A to 23C). At this time, if the switch SW1 is depressed, steps S3 and S5 are skipped, and no processing is performed. If it is determined in step S3 that the switch SW2 is depressed, flag 0 is set to be "1" in step S4 to form the flag register 321 shown in FIG. 23B. On the other hand, if it is determined in step S5 that the switch SW8 is depressed, flag 1 is set to be "1" in step S6 to form the flag register 321 shown in FIG. 23C. The contents of the flag register 321 are preserved until the next changing operation is performed in the same procedure.

Figure 25:
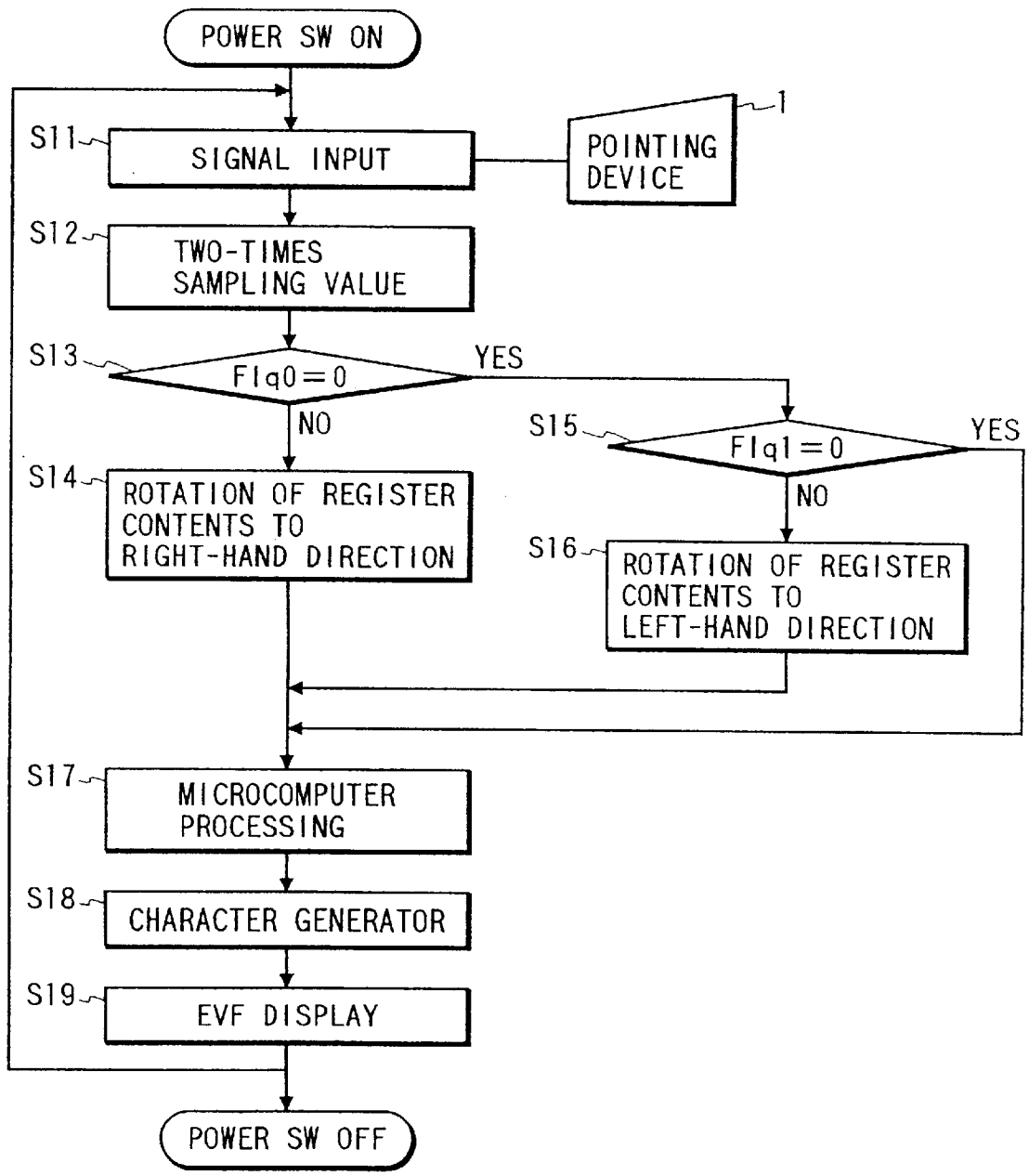
FIG. 25 is a flow chart showing the operation for realizing the rotation of the switches.

FIG. 25 is a flow chart showing the operation when the pointing device 301 is used after the flag is registered, as described above.

After the power switch is turned on, if the pointing device 301 is operated in step S11, the contents of the registers 320a and 320b are logically ORed, and the calculation results are stored in the register 320c, in step S12. In step S13, flag 0 of the flag register 321 is checked. If flag 0 is not "0", the contents of the register 320c are rotated in the right-hand direction in step S14, and thereafter, the flow advances to step S17.

On the other hand, if it is determined in step S13 that flag 0 is "0", flag 1 is checked in step S15. If flag 1 is "0", the flow advances to step S17; otherwise, the contents of the register 320c are rotated in the left-hand direction in step S16, and thereafter, the flow advances to step S17. In step S17, the microcomputer 9 performs processing in correspondence with the presence/absence of rotation in the left- or right-hand direction, and supplies a control signal for moving the cursor to the character generator 10. In step S18, the character generator 10 generates a character signal for moving the cursor. In step S19, the cursor is displayed on the monitor 4 via a synthesization circuit 12.

The above-mentioned processing is repetitively performed until the power switch is turned off.

Figure 26:
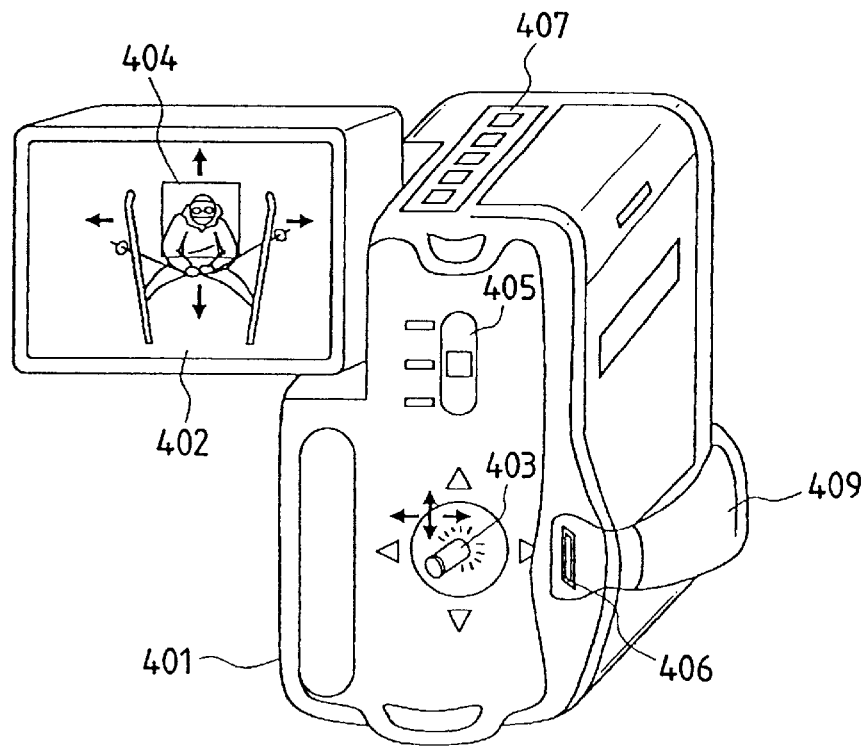
FIG. 26 is a perspective view showing a camera built-in type VTR according to the 10th embodiment of the present invention.

FIG. 26 shows a camera built-in type VTR as an image pickup apparatus of the 10th embodiment when viewed from the operator side. A camera built-in type VTR main body 401 has a camera unit for picking up an image of an object, a recording unit as recording means for recording the picked-up image, and a reproduction unit as reproduction means for reproducing the recorded image. An electronic viewfinder (to be abbreviated as an EVF hereinafter) 402 comprises a liquid crystal display, and serves as display means for displaying the picked-up image. A joystick 403 serves as operation means for selecting an arbitrary position on the screen of the EVF 402.

A display frame 404 moves to an arbitrary position on the screen of the EVF 402 in accordance with the operation of the joystick 403, so that the setting operation for, e.g., AE, AF, and the like is performed at that position. A mode selection switch 405 is used for switching the operation mode between a camera mode and a VTR mode. An image pickup start/still trigger button 406 is used for starting/ stopping an image pickup operation. Reproduction switches 407 are used in the VTR mode. A side strap 409 is used for holding the apparatus during the image pickup operation.

Figure 27B:
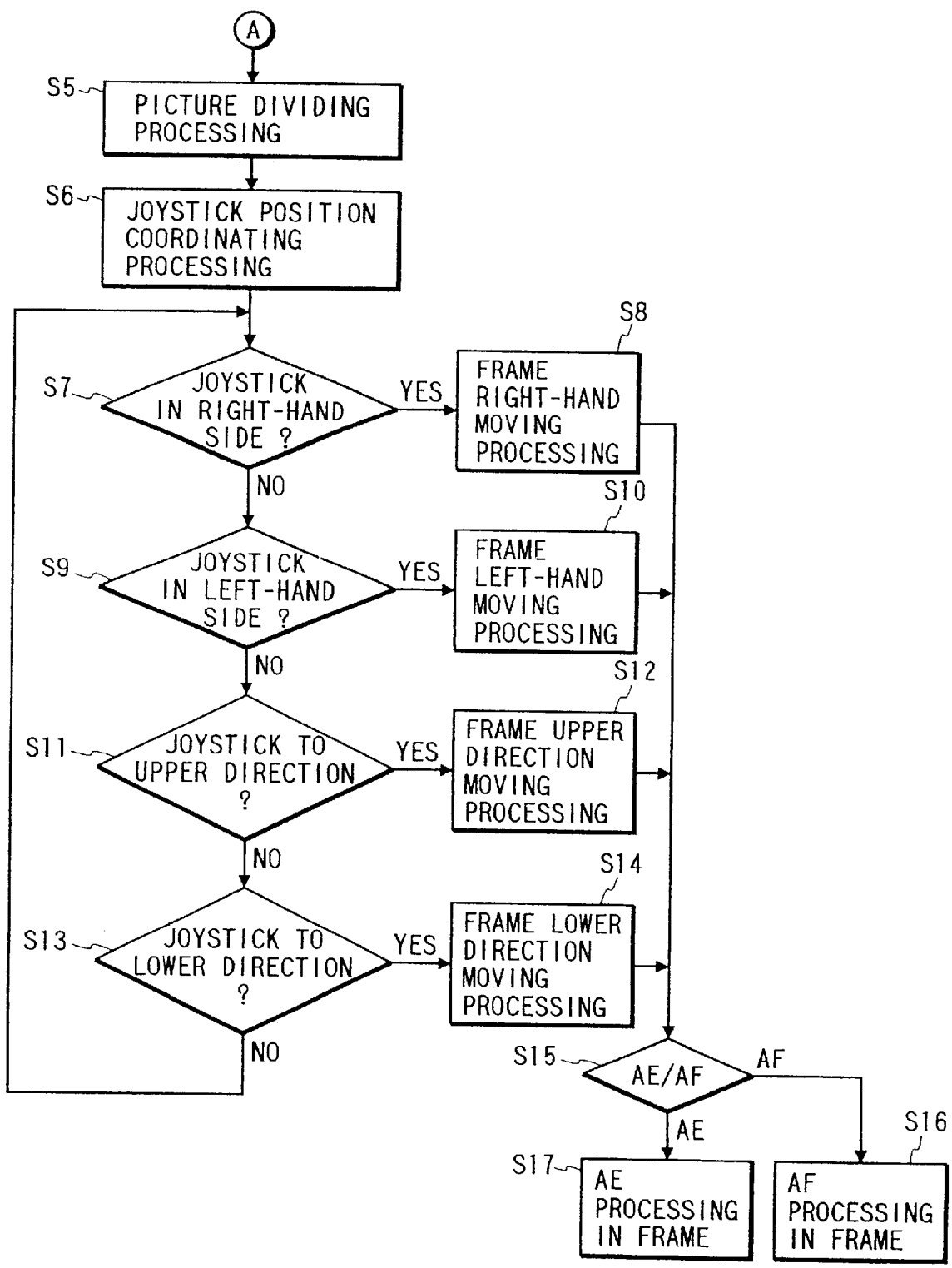
FIG. 27 is comprised of FIGS. 27A and 27B showing flow charts for explaining the operation of the 10th embodiment.

The operation of this embodiment will be described below with reference to the flow chart shown in FIGS. 27A and 27B. It is checked in step S1 if the power switch is ON. If the power switch is ON, the flow advances to step S2, and the operation mode is selected by the mode selection switch 405. If the camera mode is selected, the flow advances to step S3 to determine whether AE•AF processing is performed or a display selection is to be made. If a display selection is to be made, the flow advances to step S4 to set an initial value (PAUSE), and operations corresponding to the respective switches are performed. If the AE•AF processing is selected in step S3, the flow advances to step S5, and picture dividing processing is performed. The flow advances to step S6, and coordinating processing of the position designated by the joystick 403 is performed.

It is checked in step S7 if the joystick is moved to the right-hand side. If Y (YES) in step S7, the flow advances to step S8, and the display frame is moved to the right-hand side on the screen. If N (NO) in step S7, the flow advances to step S9 to check if the joystick is moved to the left-hand side. If Y in step S9, the flow advances to step S10, and the display frame is moved to the left-hand side on the screen. If N in step S9, the flow advances to step S11 to check if the joystick is moved in the upper direction. If Y in step S11, the flow advances to step S12, and the display frame is moved in the upper direction on the frame. If N in step S11, the flow advances to step S13 to check if the joystick is moved in the lower direction. If Y in step S13, the flow advances to step S14, and the display frame is roved in the lower direction on the frame. If N in step S13, the flow returns to step S7.

If the display frame is moved in step S8, S10, S12, or S14, the flow advances to step S15 to select the contents to be set in the display frame. If AF processing is performed, the flow advances to step S16, and an optical system (not shown) is controlled to be in focus with an object within the moved frame. On the other hand, if AE processing is performed, the flow advances to step S17 to perform control for obtaining appropriate exposure in the moved frame.

If it is determined in step S2 that the operation mode is the VTR mode, the flow advances to step S18 to set an initial value (STOP) in the apparatus. Thereafter, operations corresponding the respective switches are performed.

As described above, when the display frame used for setting an image pickup condition for AE, AF, or the like is set at an arbitrary position on the image display screen using the joystick 403, AF precision and AE precision can be improved. Since complicated setting procedures and operations can be omitted, the operability can be improved.

Since the operation key as operation means is arranged on the rear surface of the camera built-in type VTR, i.e., in the same plane as the screen, an operation can be attained with only one finger while confirming the image displayed on the screen. Since the operation directions, i.e., the upper, lower, right, and left directions, match the movement of the screen, a smooth operation is allowed.

Figure 28:
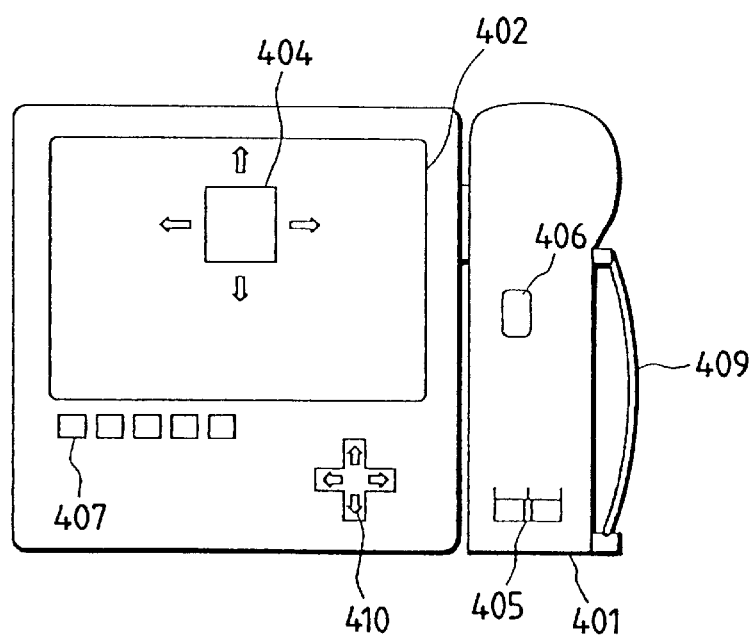
FIG. 28 is a perspective view showing another camera built-in type VTR according to the 10th embodiment of the present invention.

In this embodiment, the joystick is used as an operation key. Alternatively, as shown in FIG. 28, a cross-shaped key may be used as means for moving the frame on the screen, thus obtaining the same effect described above.

What is claimed is:

1. An electronic apparatus which can be used in a hand held state, comprising:
    a body;
    a display unit mounted on said body and arranged to display an index;
    a pointing device including an operation member arranged to actuate a movement of the index displayed by said display unit by operating; said operation member and,
    a position adjustment mechanism arranged to reposition and fix said pointing device from a first position to a second position relative to said body by lifting and sliding said pointing device along a surface of said body so as to be able to operate said operation member, when said pointing device is in said first position or in said second position.

2. The apparatus according to claim 1, wherein said position adjustment mechanism is configured so that said pointing device is pivotally adjustable from said first position to said second position about an axis perpendicular to the surface of said body.

3. An apparatus according to claim 1, wherein said position adjustment mechanism adjusts the attachment state by changing an attachment angle of said operation member with respect to said electronic apparatus.

4. An image pickup apparatus comprising:
    a body;
    an image pickup unit having a plurality of image pickup conditions, arranged to pick up an object image;
    a pointing device including an operation member, arranged to actuate said plurality of image pickup conditions by operating said operation member; and,
    a position adjustment mechanism arranged to reposition and fix said pointing device from a first position to a second position relative to said body by lifting and sliding said pointing device along a surface of said body so as to be able to operate said operation member when said pointing device is in said second position.

5. The apparatus according to claim 4, wherein one of said plurality of image pickup conditions is an exposure amount.

6. The apparatus according to claim 4, wherein one of said plurality of image pickup conditions is a focal length.

7. The apparatus according to claim 4, further comprising display unit arranged to display the object image picked up by said image pickup unit.

8. The apparatus according to claim 7, wherein one of said plurality of image pickup conditions is an exposure amount.

9. The apparatus according to claim 7, wherein one of said plurality of image pickup conditions is a focal length.

10. The apparatus according to claim 7, wherein said display unit displays an index for selecting said plurality of image pickup conditions, said operation member actuates a movement of said index.

11. The apparatus according to claim 10, wherein one of said plurality of image pickup conditions is an exposure amount.

12. The apparatus according to claim 10, wherein one of said plurality of image pickup conditions is a focal length.

13. The apparatus according to claim 7, wherein the operation member is operable for moving a display frame, which indicates a setting range of an image pickup condition of said image pickup unit on a screen of said display unit, to a desired position on the screen,
    wherein said operation member is arranged on a plane including the screen of said display unit.

14. An apparatus according to claim 13, wherein the image pickup condition of said pickup unit is an exposure amount.

15. An apparatus according to claim 13, wherein the image pickup condition of said pickup unit is a focal length.

16. An apparatus according to claim 13, wherein the screen of said display unit comprises a liquid crystal screen.

17. An apparatus according to claim 13, wherein said operation member comprises a joystick.

18. An apparatus according to claim 13, wherein said operation member comprises a cross-shaped key.

* * * * *

UNITED STATES PATENT AND TRADEMARK OFFICE
CERTIFICATE OF CORRECTION

PATENT NO. : 6,633,336 B2
DATED : October 14, 2003
INVENTOR(S) : Yoshiyuki Toyoizumi et al.

It is certified that error appears in the above-identified patent and that said Letters Patent is hereby corrected as shown below:

<u>Column 14,</u>
Line 9, please delete "operating; said" and insert therefor -- operating said --
Lines 9-10, please add -- ; -- after "member"

Signed and Sealed this

Twelfth Day of October, 2004

JON W. DUDAS
*Director of the United States Patent and Trademark Office*